United States Patent [19]

Nagai

[11] Patent Number: 5,735,120
[45] Date of Patent: Apr. 7, 1998

[54] DEVICE FOR JUDGING THE DETERIORATION OF A CATALYST OF AN ENGINE

[75] Inventor: Toshinari Nagai, Suntou-gun, Japan

[73] Assignee: Toyota Jidosha Kabushiki Kaisha, Aichi, Japan

[21] Appl. No.: 739,967

[22] Filed: Oct. 30, 1996

[30] Foreign Application Priority Data

Nov. 21, 1995 [JP] Japan ................... 7-302834

[51] Int. Cl.⁶ .......................... F01N 3/20; F02D 41/14
[52] U.S. Cl. ...................... 60/276; 60/277; 60/285
[58] Field of Search ..................... 60/274, 276, 277, 60/285; 73/118.1; 123/674

[56] References Cited

U.S. PATENT DOCUMENTS

| | | | |
|---|---|---|---|
| 5,279,116 | 1/1994 | Shimizu et al. | 60/277 |
| 5,280,707 | 1/1994 | Nakashima et al. | 60/277 X |
| 5,301,501 | 4/1994 | Shimizu et al. | 60/274 |
| 5,359,853 | 11/1994 | Shimizu | 60/276 |
| 5,377,484 | 1/1995 | Shimizu | 60/276 |
| 5,412,941 | 5/1995 | Suzuki et al. | 60/276 |
| 5,595,061 | 1/1997 | Toyoda | 60/277 X |

*Primary Examiner*—Tony M. Argenbright
*Attorney, Agent, or Firm*—Oliff & Berridge, PLC

[57] ABSTRACT

A device for judging the deterioration of a three-way catalyst comprising an upstream $O_2$ sensor and a downstream $O_2$ sensor which are arranged in the exhaust passage upstream and downstream of the three-way catalyst, respectively. The deterioration of the three-way catalyst is judged in a predetermined narrow operating region based on the output of these $O_2$ sensors. A learning value is set for control of the air-fuel ratio for the predetermined narrow operating region separate from the other operating regions.

17 Claims, 17 Drawing Sheets

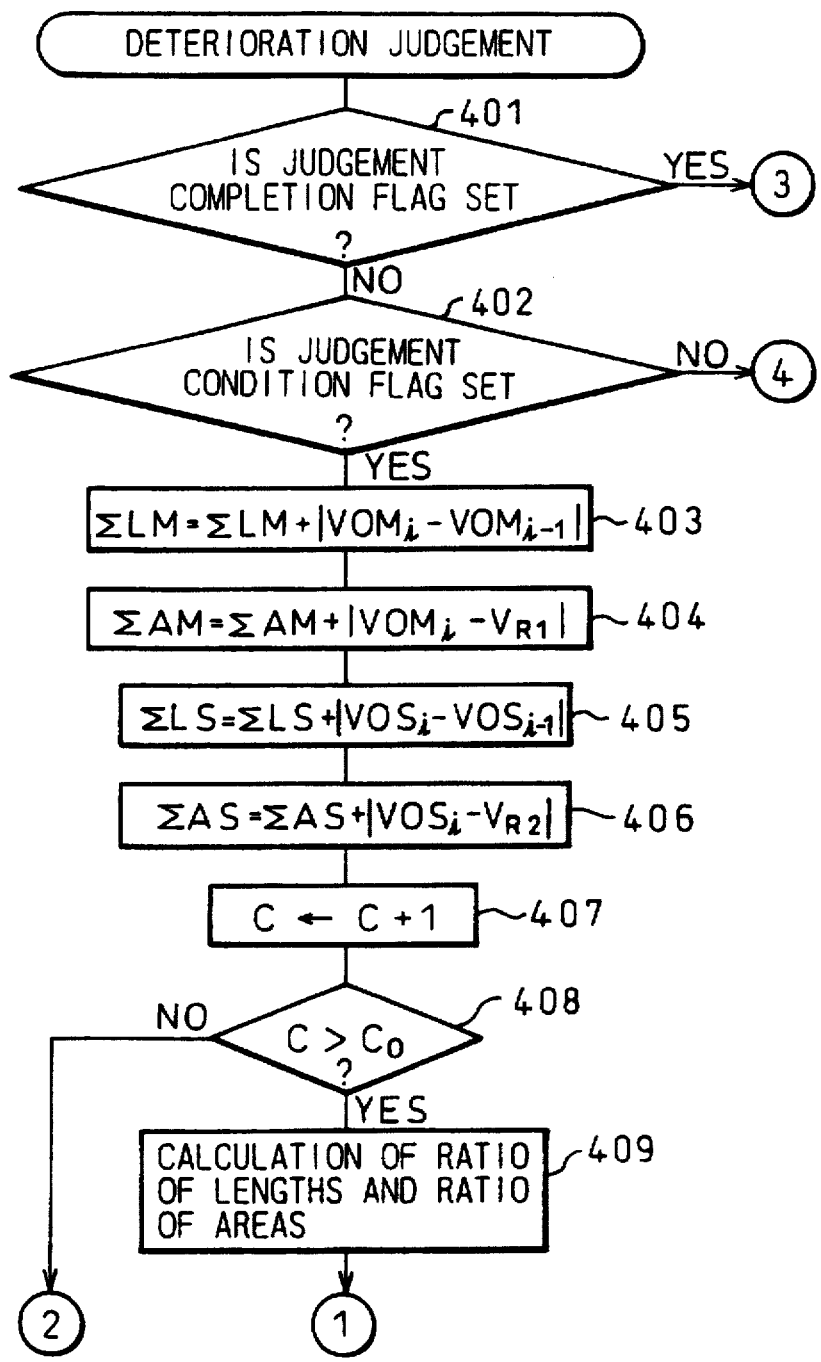

DEVICE FOR JUDGING THE DETERIORATION OF A CATALYST OF AN ENGINE

BACKGROUND OF THE INVENTION

1. Field of the Invention

The present invention relates to a device for judging the deterioration of a catalyst of an engine.

2. Description of the Related Art

Known in the art is an internal combustion engine in which a three-way catalyst is arranged in its exhaust passage, an upstream air-fuel ratio sensor is arranged in the engine exhaust passage upstream of the three-way catalyst, a downstream air-fuel ratio sensor is arranged in the engine exhaust passage downstream of the three-way catalyst, the air-fuel ratio is controlled to the stoichiometric air-fuel ratio based on the signals output from the upstream air-fuel ratio sensor and the downstream air-fuel ratio sensor, and whether the three-way catalyst has deteriorated is judged based on the signals output from the upstream air-fuel ratio sensor and the downstream air-fuel ratio sensor (see Japanese Unexamined Patent Publication (Kokai) No. 5-163989).

On the other hand, in many internal combustion engines, the air-fuel ratio is controlled by feedback to a target air-fuel ratio based on an air-fuel ratio feedback control value which changes in accordance with the output of an air-fuel ratio sensor arranged in the exhaust passage of the engine, the center of fluctuation of the air-fuel ratio feedback control value is found as a learning value at the time of a predetermined engine operating state, and that learning value is reflected in the control of the air-fuel ratio. In this case, the learning value is usually set separately for each operating region of the engine. That is, when the operating state of the engine, for example, the amount of intake air of the engine, becomes different, the center of fluctuation of the feedback control value becomes slightly different, so the learning value also differs. Accordingly, usually the operating region of the engine is divided into a number of smaller operating regions in accordance with the amount of intake air and separate learning values are set for each of the operating regions, that is, the learning regions.

When judging deterioration of a catalyst based on the output signal of an air-fuel ratio sensor, however, once the air-fuel ratio deviates from the target air-fuel ratio, there is the extremely great risk that it will be erroneously judged that the catalyst has deteriorated when it actually has not or else it will be erroneously judged that the catalyst has not deteriorated when it actually has. Accordingly, when judging the deterioration of a catalyst based on the output signal of an air-fuel ratio sensor, it is necessary to judge the deterioration of the catalyst in a narrow operating region giving a stable air-fuel ratio so that such erroneous judgements are not caused. Further, it is necessary to reflect a learning value in the control of the air-fuel ratio to maintain the air-fuel ratio accurately at the target air-fuel ratio at this time.

On the other hand, the operating region suited to judgement of the deterioration of a catalyst, that is, the deterioration judgement operating region, is considerably narrower than the operating regions divided in accordance with the amount of intake air, that is, the learning regions. The deterioration judgement operating region is no more than a small part of one of these learning regions. Accordingly, it is also possible to use the learning value of the learning region containing the deterioration judgement operating region as the learning value when judging the deterioration. The learning region, however, is considerably large and the learning value of the learning region shows the average value of the large learning region, so the learning value of the learning region does not necessarily represent the optimal learning value for the deterioration judgement operating region. Accordingly, if the learning value of the learning region is used as the learning value at the time of judgement of deterioration, the air-fuel ratio ends up deviating from the target air-fuel ratio and therefore the problem of erroneous judgement of the deterioration of the catalyst occurs.

SUMMARY OF THE INVENTION

An object of the present invention is to provide a device for judging the deterioration of a catalyst which is capable of accurately judging whether or not the catalyst has deteriorated.

According to the present invention, there is provided a device for judging the deterioration of a catalyst arranged in an exhaust passage of an engine, the device comprising air-fuel ratio detecting means arranged in the exhaust passage and producing an output signal which represents an air-fuel ratio; feedback control means for controlling an air-fuel ratio by a feedback control value, which changes in accordance with a change in the output signal of the air-fuel ratio detecting means, to equalize the air-fuel ratio with a target air-fuel ratio; first learning value calculating means for calculating a first learning value, which represents a value of the center of fluctuation of the feedback control value when the engine is operating in a predetermined first operating region, to reflect the first learning value in control of the air-fuel ratio when the engine is operating in the first operating region; judging means for judging whether or not the catalyst has deteriorated when the engine is operating under a predetermined second operating region which is a limited narrower region within the first operating region; and second learning value calculating means for calculating a second learning value, which represents a value of the center of fluctuation of the feedback control value when the engine is operating in the second operating region, to reflect the second learning value in control of the air-fuel ratio when the engine is operating in the second operating region.

BRIEF DESCRIPTION OF THE DRAWINGS

The present invention may be more fully understood from the description of a preferred embodiment of the invention set forth below together with the accompanying drawings, in which:

FIGS. 17 and 18 are flow charts of the judgement of deterioration of the three-way catalyst.

DESCRIPTION OF A PREFERRED EMBODIMENT

Figure 1:
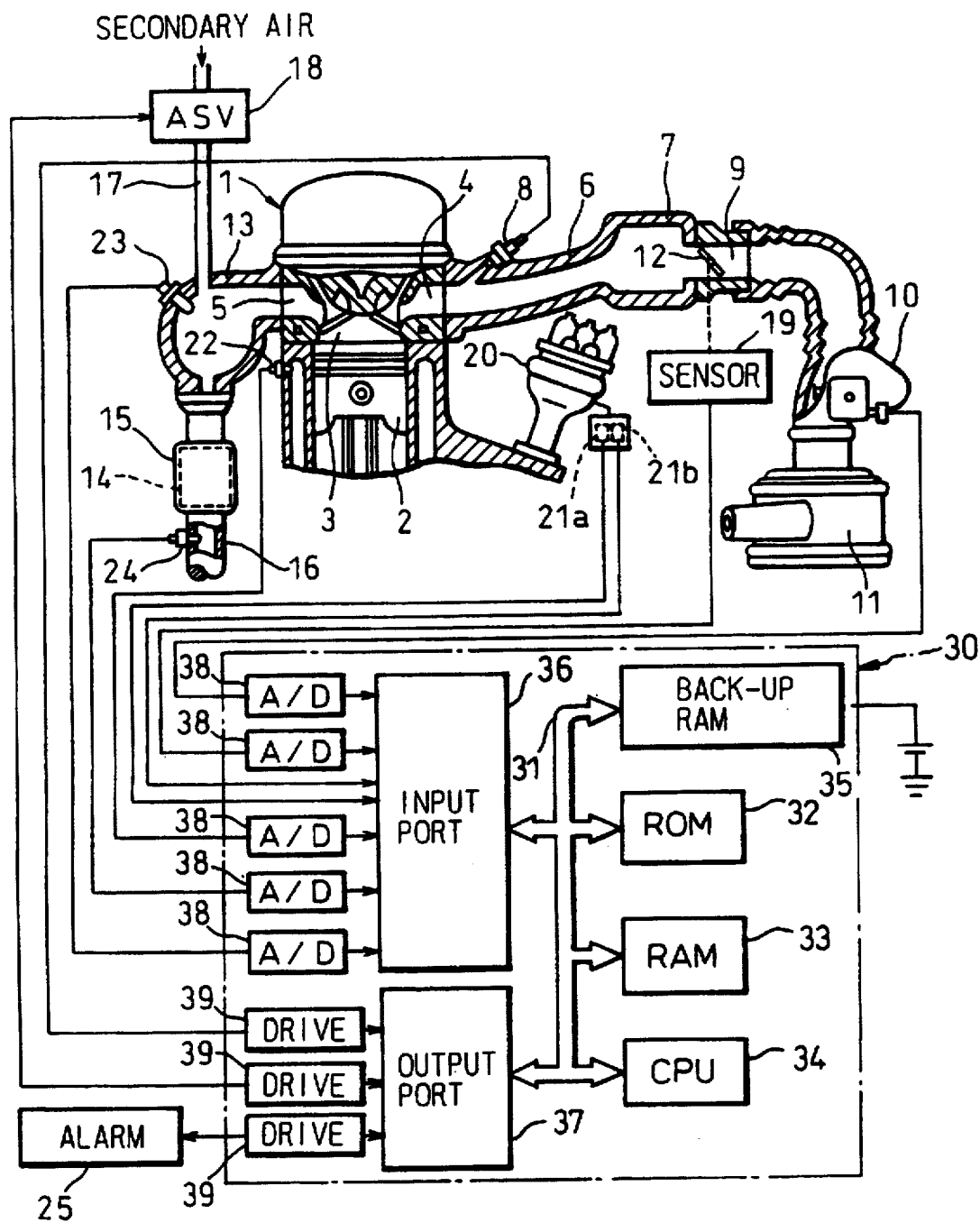
FIG. 1 is an overview of an internal combustion engine.

Referring to FIG. 1, 1 is an engine body, 2 is a piston, 3 is a combustion chamber, 4 is an intake port, and 5 is an exhaust port. The intake port 4 is connected through an intake pipe 6 to a surge tank 7. Each intake pipe 6 is provided with a fuel injector 8 injecting fuel toward the inside of the corresponding intake port 4. The surge tank 7 is connected through an intake duct 9 and air flow meter 10 to an air cleaner 11. Inside the intake duct 9 is arranged a throttle valve 12. On the other hand, the exhaust port 5 is connected to an exhaust manifold 13. This exhaust manifold 13 is connected to an exhaust pipe 16 through a catalytic converter 15 housing a three-way catalyst 14 able to simultaneously reduce the amounts of the unburnt hydrocarbons, carbon monoxide, and $NO_x$ in the exhaust gas. The exhaust manifold 13 is connected to a secondary air feed conduit 17. In the secondary air feed conduit 17 is arranged a secondary air feed control valve 18.

An electronic control unit 30 is comprised of a digital computer which is provided with a read only memory (ROM) 32, random access memory (RAM) 33, central processing unit (CPU) 34, backup RAM 35 connected at all times to a power source, input port 36, and output port 37 connected with each other by a bidirectional bus 31. The air flow meter 10 generates an output voltage proportional to the amount of intake air. This output voltage is input through the corresponding AD converter 38 to the input port 36. The throttle valve 12 is provided with a throttle sensor 19 which generates an output voltage proportional to the throttle opening. The output voltage of the throttle sensor 19 is input through the corresponding AD converter 38 to the input port 36.

A distributor 20 is provided with a top dead center sensor 21a generating a signal showing that for example the no. 1 cylinder is at the top dead center of the intake stroke and a crank angle sensor 21 generating an output pulse each time the crank shaft rotates by 30 degrees. The output signal of the top dead center sensor 21a and the output pulse of the crank angle sensor 21b are input to the input port 36. In the CPU 34, the current crank angle and the engine speed are calculated from the output signal of the top dead center sensor 21a and the output pulse of the crank angle sensor 21b. The engine body 1 is provided with a temperature sensor 22 for generating an output voltage proportional to the temperature of the engine coolant. The output voltage of the temperature sensor 22 is input through the corresponding AD converter 38 to the input port 36.

Inside the exhaust manifold 13 upstream of the three-way catalyst 14 is arranged an air-fuel ratio sensor 23 for detecting the air-fuel ratio from the concentration of oxygen in the exhaust gas. Inside the exhaust pipe 16 downstream of the three-way catalyst 14 is arranged an air-fuel ratio sensor 24 for detecting the air-fuel ratio from the concentration of oxygen in the exhaust gas. Note that the air-fuel ratio sensor 23 arranged at the upstream side of the three-way catalyst 13 is referred to below as the upstream $O_2$ sensor, while the air-fuel ratio sensor 24 arranged at the downstream side of the three-way catalyst 13 is referred to as the downstream $O_2$ sensor. The output signals of the upstream $O_2$ sensor 23 and the downstream $O_2$ sensor 24 are input through the corresponding AD converter 38 to the input port 36. On the other hand, the output port 37 is connected through the corresponding drive circuits 39 to the fuel injector 8, secondary air feed control valve 18, and alarm lamp, alarm buzzer, or other alarm device 25.

In the embodiment according to the present invention, the fuel injection time TAU is calculated based on the following equation:

$$TAU=TP \cdot FAF \cdot K \cdot KG+\gamma$$

Figure 2:
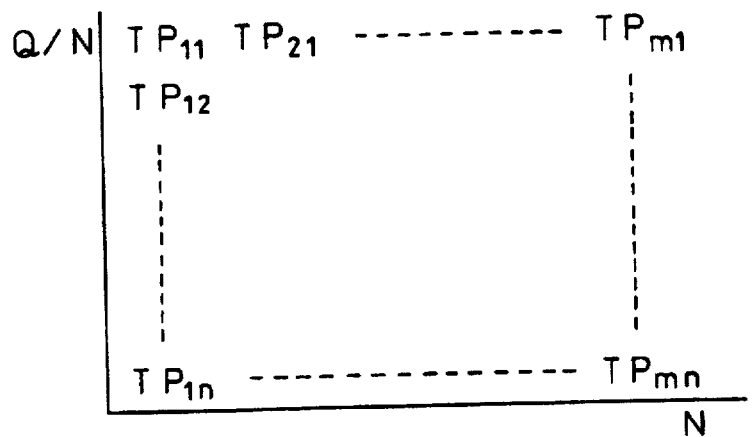
FIG. 2 is a view of a map of a basic fuel injection time TP.

Here, TP shows a basic fuel injection time, FAF a feedback correction coefficient, K an increase coefficient, KG a learning coefficient, and $\gamma$ an invalid injection time. The basic fuel injection time TP is the injection time required for making the air-fuel ratio the stoichiometric air-fuel ratio. This basic fuel injection time TP is found in advance by experiments as a function of the engine load Q/N (amount of intake air Q/engine speed N) and the engine speed N and is stored in advance in the ROM 32 in the form of a map as a function of the engine load Q/N and engine speed N as shown in FIG. 2.

Figure 3:
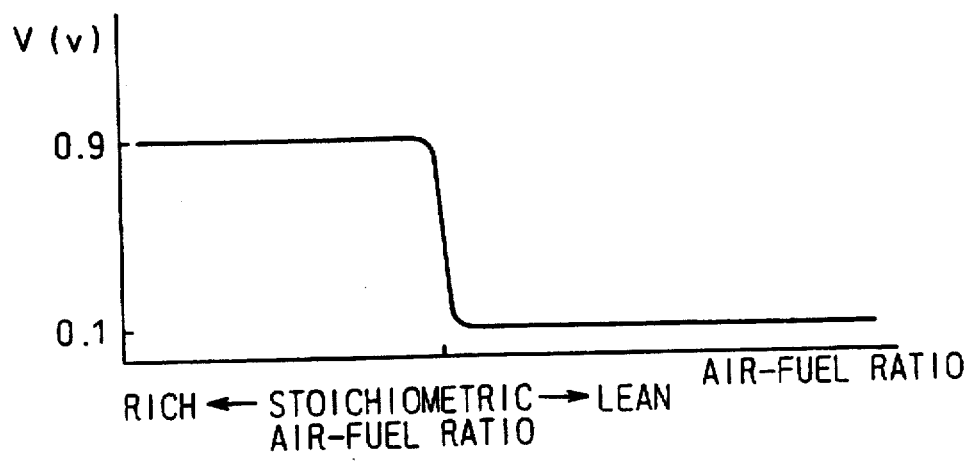
FIG. 3 is a graph of the output voltage of an $O_2$ sensor.

The feedback correction coefficient FAF is changed based on the output signal of the upstream $O_2$ sensor 23 so that the air-fuel ratio becomes the stoichiometric air-fuel ratio. This feedback correction coefficient FAF usually shifts up and down about 1.0. That is, the upstream $O_2$ sensor 23 generates an output voltage of about 0.1 V when the air-fuel ratio is lean as shown in FIG. 3 and generates an output voltage of about 0.9 V when the air-fuel ratio is rich. When it is judged from the output voltage of the upstream $O_2$ sensor 23 that the air-fuel ratio is lean, the feedback correction coefficient FAF is increased, while when it is judged that the air-fuel ratio is rich, the feedback correction coefficient FAF is reduced. As a result, the air-fuel ratio is controlled to the stoichiometric air-fuel ratio.

The increase coefficient K is usually fixed to 1.0. When the fuel is to be increased, that is, when the air-fuel ratio is to be made rich, it becomes a value larger than 1.0.

The learning coefficient KG is for maintaining the center of fluctuation of the feedback correction coefficient FAF at about 1.0. That is, when the center of fluctuation of the feedback correction coefficient FAF becomes larger than 1.0, the learning coefficient KG is increased to bring the center of fluctuation of the feedback correction coefficient FAF close to 1.0, while when the center of fluctuation of the feedback correction coefficient FAF becomes smaller than 1.0, the learning coefficient KG is decreased to bring the center of fluctuation of the feedback correction coefficient FAF close to 1.0. Therefore, the learning coefficient is changed so that the center of fluctuation of the feedback correction coefficient FAF becomes about 1.0.

However, in the period after the engine starts up until the upstream $O_2$ sensor 23 is activated, that is, until the upstream $O_2$ sensor 23 generates a correct output signal, the feedback control of the air-fuel ratio is suspended. During this time, the feedback correction coefficient FAF is fixed at 1.0. Even if the feedback control of the air-fuel ratio is suspended in this way, however, the air-fuel ratio is maintained at the target air-fuel ratio by the correcting action of the fuel injection time based on the learning coefficient KG. Note that at this time the value of the learning coefficient KG for maintaining the air-fuel ratio at the target air-fuel ratio, that is, the learning value, becomes different in the operating regions of the engine, therefore this learning coefficient KG is usually provided separately for each operating region of the engine. In the embodiment of the present invention, this learning coefficient KG is set separately for operating regions divided according to the magnitude of the amount of intake air Q as shown by $KG_1$, $KG_2$, $KG_3$, and $KG_4$ in FIG.

4. That is, in the embodiment of the present invention, when the amount of intake air Q is extremely small, the learning coefficient $KG_1$ is used regardless of the engine speed N. As the amount of intake air Q increases, the learning coefficients $KG_2$, $KG_3$, and $KG_4$ are successively used.

If such a plurality of learning coefficients $G_i$ (i=1, 2, 3, 4 ...) are used, the air-fuel ratio may be controlled to the target air-fuel ratio in all operating regions even when the feedback control of the air-fuel ratio has been stopped just after engine startup. Further, if such a plurality of learning coefficients $G_i$ are used, the air-fuel ratio may be maintained at substantially the target air-fuel ratio even when the amount of intake air Q changes when feedback control of the air-fuel ratio is being performed.

Figure 4:
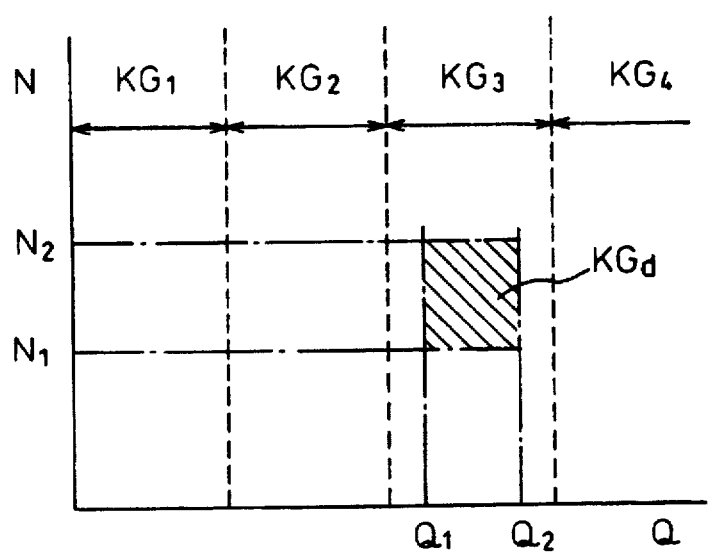
FIG. 4 is a view of the learning regions.

On the other hand, the operating region where the deterioration of the three-way catalyst 14 is judged is shown by the hatching in FIG. 4. In the embodiment shown in FIG. 4, the operating region where the amount of intake air Q is $Q_1<Q<Q_2$ and the engine speed N is $N_1<N<N_2$ is considered the operating region for judgement of deterioration of the three-way catalyst 14. If the air-fuel ratio deviates from the target air-fuel ratio when the deterioration of the three-way catalyst 14 is being judged, there is an extremely high risk of erroneous judgement being caused and therefore the deterioration of the three-way catalyst 14 is judged in the narrow operating region giving a stable air-fuel ratio as shown by the hatching in FIG. 4.

On the other hand, the deterioration judgement operating region is included in the operating region where the learning coefficient $KG_3$ is used, that is, in the learning region of the learning coefficient $KG_3$, therefore the learning coefficient $KG_3$ can also be used as the learning coefficient used when judging deterioration. However, the learning region of the learning coefficient $KG_3$ is considerably larger than the deterioration judgement operating region and therefore the optimal learning value in the narrow deterioration judgement operating region and the value of the learning coefficient $KG_3$ normally do not match. Accordingly, if the learning coefficient $KG_3$ is used at the time of judgement of deterioration, the air-fuel ratio will end up deviating from the target air-fuel ratio and therefore erroneous judgement of the deterioration will occur. To prevent this erroneous judgement from occurring, it is necessary to set the learning coefficient separately for the deterioration judgement operating region. Therefore, in the embodiment of the present invention, a separate learning coefficient $KG_d$ is set for the deterioration judgement region.

Note that in this embodiment of the present invention, the feedback correction coefficient FAF is further controlled based on the output signal of the downstream $O_2$ sensor 24. That is, when the center of fluctuation of the air-fuel ratio at the upstream side of the three-way catalyst 14 is off from the stoichiometric air-fuel ratio, the feedback correction coefficient FAF is controlled based on the output signal of the downstream $O_2$ sensor 24 so that the center of fluctuation of the air-fuel ratio at the upstream side of the three-way catalyst 14 becomes close to the stoichiometric air-fuel ratio. The downstream $O_2$ sensor 24 also generates an output voltage of about 0.1 V when the air-fuel ratio is lean and generates an output voltage of about 0.9 V when the air-fuel ratio is rich as shown in FIG. 3.

Next, an explanation will be made of the routine for control of the feedback of the air-fuel ratio based on the output signal of the upstream $O_2$ sensor 23 referring to FIG. 5 to FIG. 7. Note that this routine is executed by interruption every predetermined time period, for example, every 4 ms.

Figure 5:
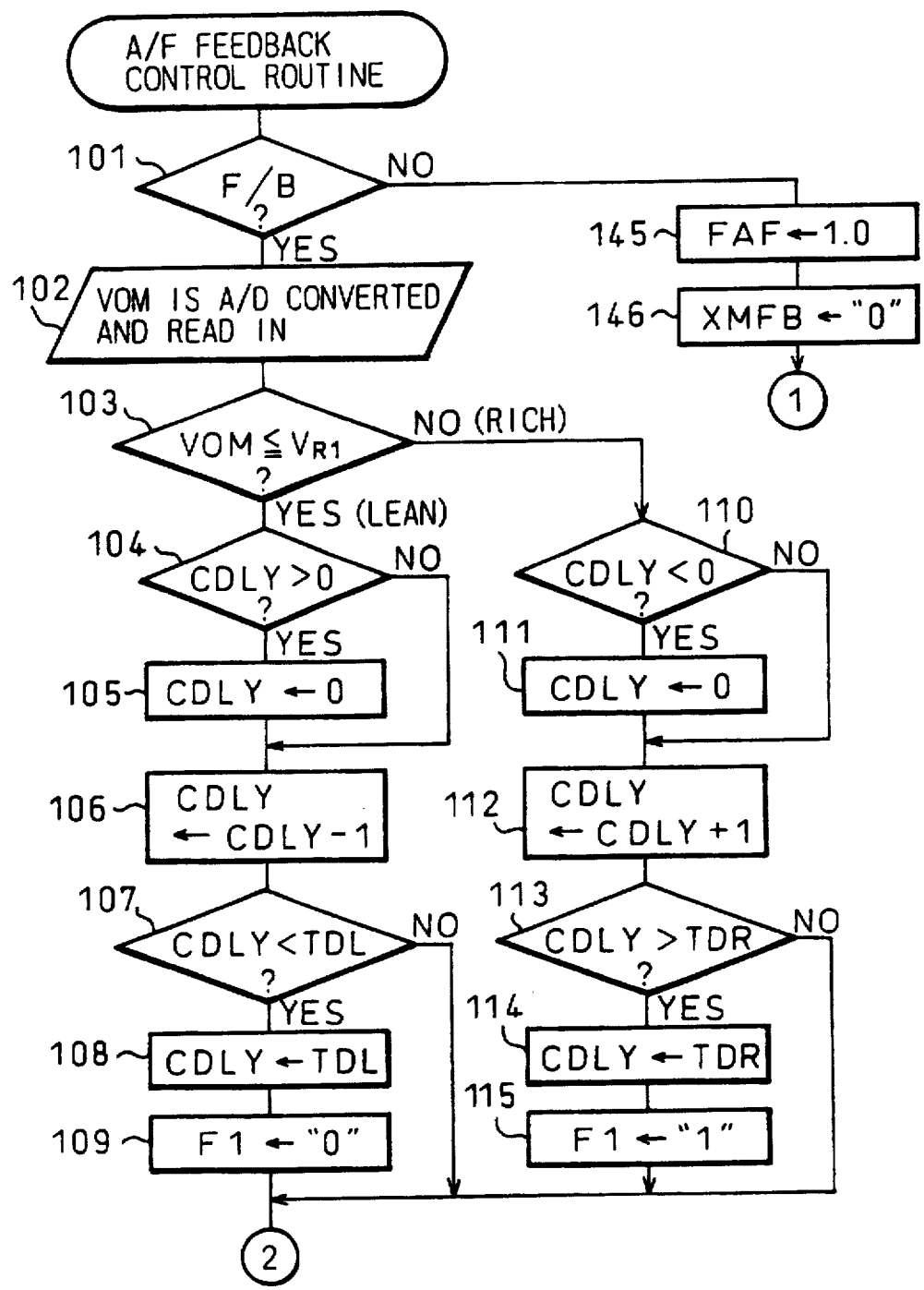
FIGS. 5, 6, and 7 are flow charts of the feedback control of the air-fuel ratio.
Figure 6:
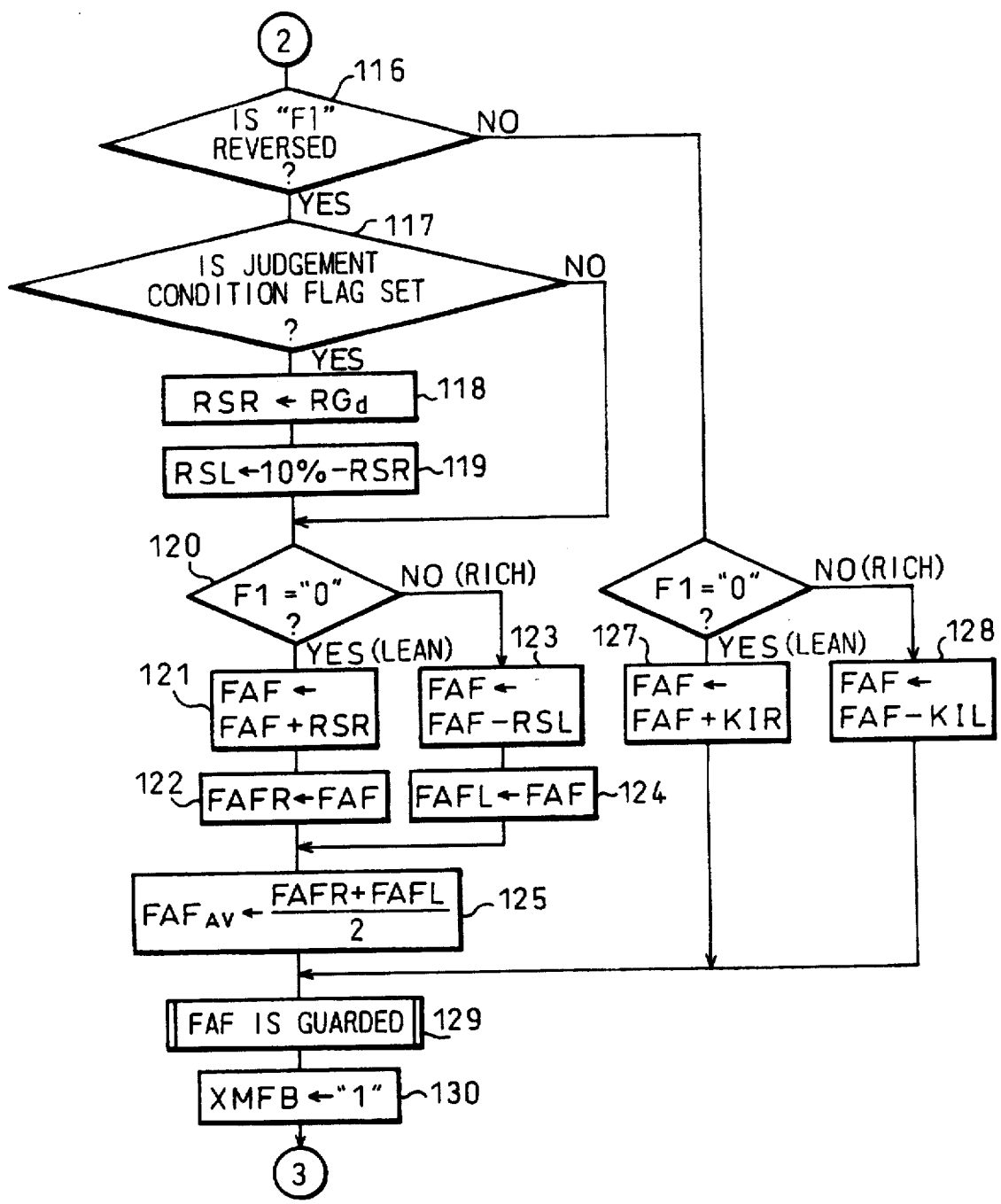
Figure 7:
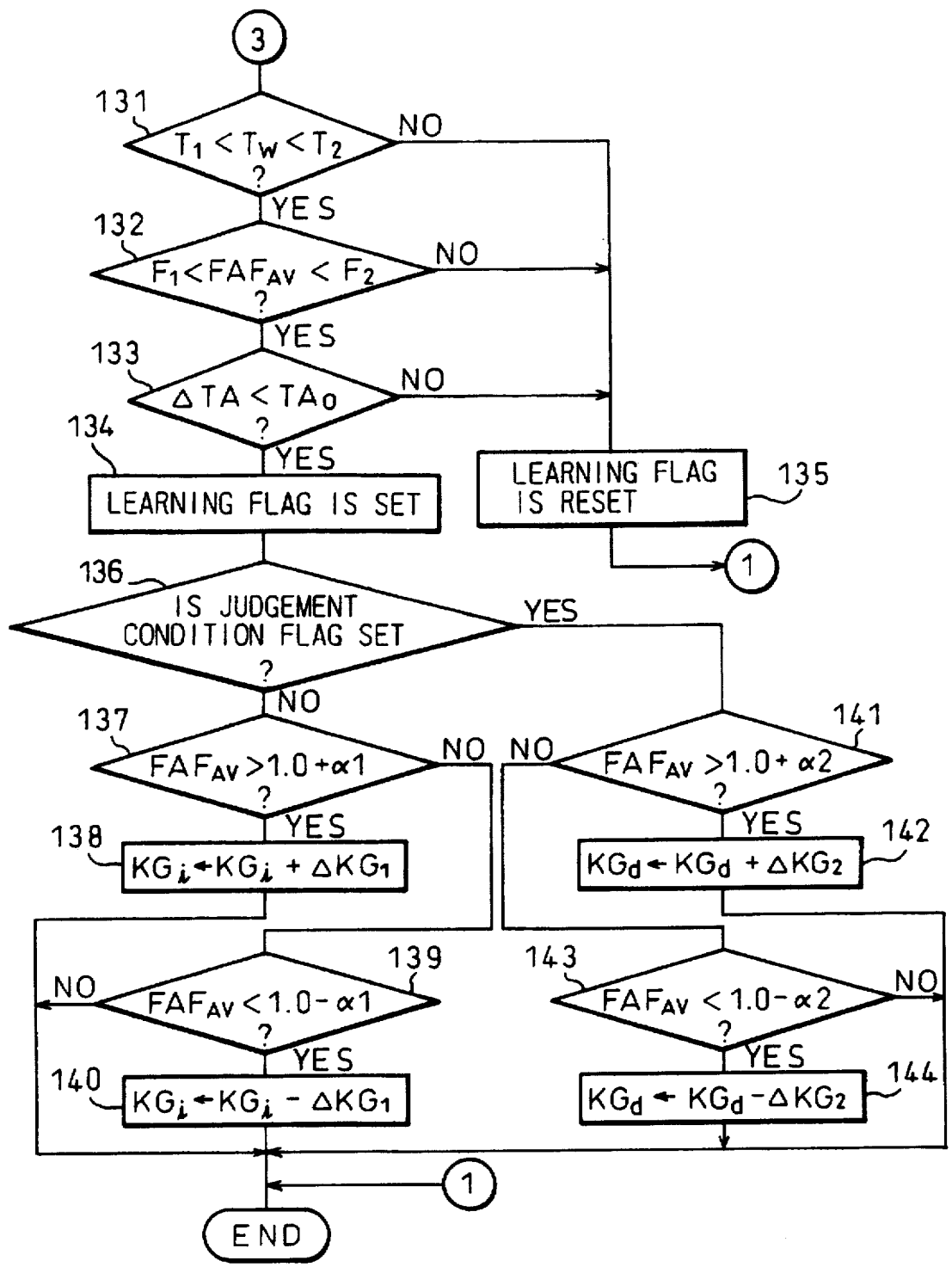

Referring to FIG. 5 to FIG. 7, first, at step 101, it is judged if the feedback conditions of the air-fuel ratio by the upstream $O_2$ sensor 23 are satisfied or not. It is judged that the feedback conditions are not satisfied when the temperature of the engine coolant is less than the set value, during engine startup, increasing injection immediately after startup, increasing injection during warmup, increasing injection during power operation, increasing injection for preventing catalyst overheating, when the upstream $O_2$ sensor 23 is not activated, when the secondary air is being supplied, and when fuel injection is stopped during deceleration. When the feedback conditions are not satisfied, the routine proceeds to step 145, where the feedback correction coefficient FAF is made 1.0, then at step 146, the air-fuel ratio feedback flag XMFB is made "0". As opposed to this, when the feedback conditions are satisfied, the routine proceeds to step 102.

At step 102, the output VOM of the upstream $O_2$ sensor 23 is converted from an analog to digital format and fetched, then at step 103 it is judged if the air-fuel ratio is rich or lean based on whether the VOM is lower than the relative voltage $V_{R1}$. This relative voltage $V_{R1}$ is made the voltage of the center of amplitude of the $O_2$ sensor output and in this embodiment is $V_{R1}=0.45$ V. When it is judged at step 103 that the air-fuel ratio is lean (VOM$\leq V_{R1}$), the routine proceeds to step 104, where it is judged if the delay counter CDLY is positive or not. If CDLY>0, then at step 105 CDLY is made 0, then the routine proceeds to step 106. At step 106, the delay counter CDLY is decremented by exactly "1", then at steps 107 and 108, the delay counter CDLY is guarded by the minimum value TDL. In this case, when the delay counter CDLY reaches the minimum value TDL, the air-fuel ratio flag F1 is made "0" (lean) at step 109. Note that this minimum value TDL is a negative value.

On the other hand, when it is judged at step 103 that the air-fuel ratio is rich (VOM>$V_{R1}$), the routine proceeds to step 110, where it is judged if the delay counter CDLY is negative or not. If CDLY<0, then the CDLY is made 0 at step 111, then the routine proceeds to step 112. At step 112, the delay counter CDLY is incremented by exactly "1", then at steps 113 and 114, the delay counter CDLY is guarded by the maximum value TDR. In this case, when the delay counter CDLY reaches the maximum value TDR, the air-fuel ratio flag F1 is made "1" (rich) at step 115. Note that this maximum value TDR is a positive value.

Next, at step 116, it is judged if the sign of the air-fuel ratio flag F1 has inverted or not. When the sign of the air-fuel ratio has inverted, the routine proceeds to step 117, where it is judged if the judgement condition flag was set between the previous interruption and the current interruption. The judgement condition flag is set when the conditions for judgement of deterioration of the three-way catalyst 14 stand. When the judgement condition flag is not set, the routine jumps to step 120, while when the judgement condition flag is set, it proceeds to step 118.

At step 118, the deterioration judgement learning value $RG_d$ of the amount of skip of the feedback correction coefficient FAF is made the amount of skip RSR in the rich direction. The deterioration judgement learning value $RG_d$ will be explained in detail later. Next, at step 119, RSR is subtracted from 10 percent so as to calculate the amount of skip RSL in the lean direction. That is, RSR and RSL are determined to satisfy RSR+RSL=10 percent. Next, the routine proceeds to step 120.

At step 120, it is judged if the air-fuel ratio inverted from rich to lean or inverted from lean to rich based on the air-fuel ratio flag F1. If inverted from rich to lean, at step 121, FAF is increased in skips as FAF→FAF+RSR, then at step 122, the value of the FAF just after the FAF is increased in skips is made FAFR (see FIG. 8). Next, the routine proceeds to step 125. As opposed to this, if inverted from lean to rich, at step 123, FAF is reduced in skips as FAF→FAF−RSL, then at step 124, the value of FAF just after FAF is reduced in skips is made FAFL (see FIG. 8). Next, the routine proceeds to step 125. At step 125, the average value of FAFR and FAFL, that is, the average value $FAF_{AV}$ of fluctuation of FAF, is found. Next, the routine proceeds to step 129.

On the other hand, when it is judged at step 116 that the sign of the air-fuel ratio flag F1 has not been inverted, processing for integration is performed at steps 126, 127, and 128. That is, at step 126, it is judged if F1="0". If F1="0" (lean), then at step 127, FAF→FAF+KIR, while if F1="1" (rich), at step 128, FAF→FAF−KIL. Here, the integration constants KIR and KIL are set sufficiently smaller than the skip amounts RSR and RSL so that KIR (KIL)<RSR (RSL). When F1="0" (lean) due to this integration processing, the amount of fuel injection is gradually increased, while when F1="1" (rich), the amount of fuel injection is gradually reduced.

Next, at step 129, the feedback correction coefficient FAF computed at steps 121, 123, 127, and 128 is guarded by the minimum value, for example, 0.8 or guarded by the maximum value, for example, 1.2. Due to this, when for some reason or another the feedback correction coefficient FAF becomes too large or too small, the air-fuel ratio of the engine is kept from fluctuating and thereby the air-fuel ratio is prevented from becoming overly rich or overly lean. Next, at step 130, the air-fuel ratio feedback flag XMFB is made "1".

Next, at step 131, it is judged if the engine coolant water temperature Tw is $T_1<Tw<T_2$. When $T_1<Tw<T_2$, the routine proceeds to step 132, where it is judged if the average value $FAF_{AV}$ of fluctuation of FAF is $F_1<FAF_{AV}<F_2$, that is, if the air-fuel ratio is stable. When $F_1<FAF_{AV}<F_2$, the routine proceeds to step 133, where it is judged if the change in opening ΔTA of the throttle valve 12 in the period from the previous interruption to the current interruption is smaller than a predetermined opening $TA_0$ or not, that is, if the engine has been operating steadily. When $ΔTA<A_0$, the routine proceeds to step 134, where the learning flag is set. That is, it is judged that the learning conditions of the learning coefficient $KG_i$ (i=1, 2, 3, 4 . . . ) stand.

In this way, the learning conditions of the learning coefficient $KG_i$ stand when the feedback conditions stand and further $T_1<Tw<T_2$, $F_1<FAF_{AV}<F_2$, and $ΔTA<TA_0$. As opposed to this, when the feedback conditions stand, but $T_1<Tw<T_2$ does not stand or $F_1<FAF_{AV}<F_2$ does not stand or $ΔTA<TA_0$ does not stand, it is judged that the learning conditions do not stand. At this time, the routine proceeds to step 135, where the learning flag is reset.

When the learning flag is set at step 134, the routine proceeds to step 136, where it is judged if the judgement condition flag showing that the conditions for judgement of deterioration of the three-way catalyst 14 stand has been set. When the judgement condition flag has not been set, the routine proceeds to step 137, where it is judged if the average value $FAF_{AV}$ of fluctuation of FAF is larger than 1.0+α1 (α1 is a constant value considerably smaller than 1.0). When $FAF_{AV}>1.0+α1$, the routine proceeds to step 138, where a constant value $ΔKG_1$ is added to one of the learning coefficients $KG_i$ determined from the amount of intake air Q. As opposed to this, when $FAF_{AV}≤1.0+α1$, the routine proceeds to step 139, where it is judged if the average value $FAF_{AV}$ of fluctuation of FAF is smaller than 1.0−α1. When $FAF_{AV}<1.0−α1$, the routine proceeds to step 140, where the constant value $ΔKG_1$ is subtracted from one of the learning coefficients $KG_i$ determined from the amount of intake air Q. That is, the values of the learning coefficients $KG_i$ are updated so that the average value $FAF_{AV}$ of the fluctuation of the FAF becomes $1.0−α1<FAF_{AV}<1.0+α1$.

On the other hand, when it is judged at step 136 that the judgement condition flag is set, the routine proceeds to step 141, where it is judged if the average value $FAF_{AV}$ of fluctuation of FAF is larger than 1.0+α2 (α2 is a constant value smaller than α1). When $FAF_{AV}>1.0+α2$, the routine proceeds to step 142, where the constant value $ΔKG_2$ ($ΔKG_2$ is smaller than $ΔKG_1$) is added to the deterioration judgement learning coefficient $KG_d$. As opposed to this, when $FAF_{AV}≤1.0+α2$, the routine proceeds to step 143, where it is judged if the average value $FAF_{AV}$ of fluctuation of FAF is smaller than 1.0−α2. When $FAF_{AV}<1.0−α2$, the routine proceeds to step 144, where the constant value $ΔKG_2$ is subtracted from the deterioration judgement learning coefficient $KG_d$. That is, the value of the deterioration judgement learning coefficient $KG_d$ is updated so that the average value $FAF_{AV}$ of the fluctuation of the FAF becomes $1.0−α2<FAF_{AV}<1.0+α2$.

The judgement condition flag is set when, as explained later, the learning conditions stand and the engine is operating in the limited operating region shown by the hatching in FIG. 4. At this time, as shown at step 118, on the one hand, the deterioration judgement learning value $RG_d$ is made the rich direction skip amount RSR and on the other hand the deterioration judgement learning coefficient $KG_d$ is updated as shown from step 141 to step 144. Note that in the updating of the deterioration judgement learning coefficient $KG_d$, α2 smaller than α1 is used and $ΔKG_2$ smaller than $ΔKG_1$ is used for the following reason.

That is, during normal learning where the learning coefficient $KG_i$ is updated, the value of $ΔKG_i$ is made a relatively large value so as to track the learning coefficient $KG_i$ responding well to the fluctuations of the air-fuel ratio. As opposed to this, during judgement of deterioration, the value of α2 is made smaller than the value of α1 so as to make the center of fluctuation of the air-fuel ratio match accurately with the stoichiometric air-fuel ratio and the value is $ΔKG_2$ is made smaller than the value of $ΔKG_1$ so as to prevent an effect by the temporary fluctuation of the air-fuel ratio. Note that since the judgement of deterioration is performed in the operating region with the stable air-fuel ratio, even if α2 is made smaller than α1, the frequency of updating of $KG_d$ is about the same as the frequency of updating of $KG_i$ or less than the frequency of updating of $KG_i$. Accordingly, considering that $ΔKG_2<ΔKG_1$, the rate of updating of the value of the deterioration judgement learning coefficient $KG_d$ is slower than the rate of updating of the learning coefficient $KG_i$ when the conditions for judgement of deterioration do not stand.

Figure 8:
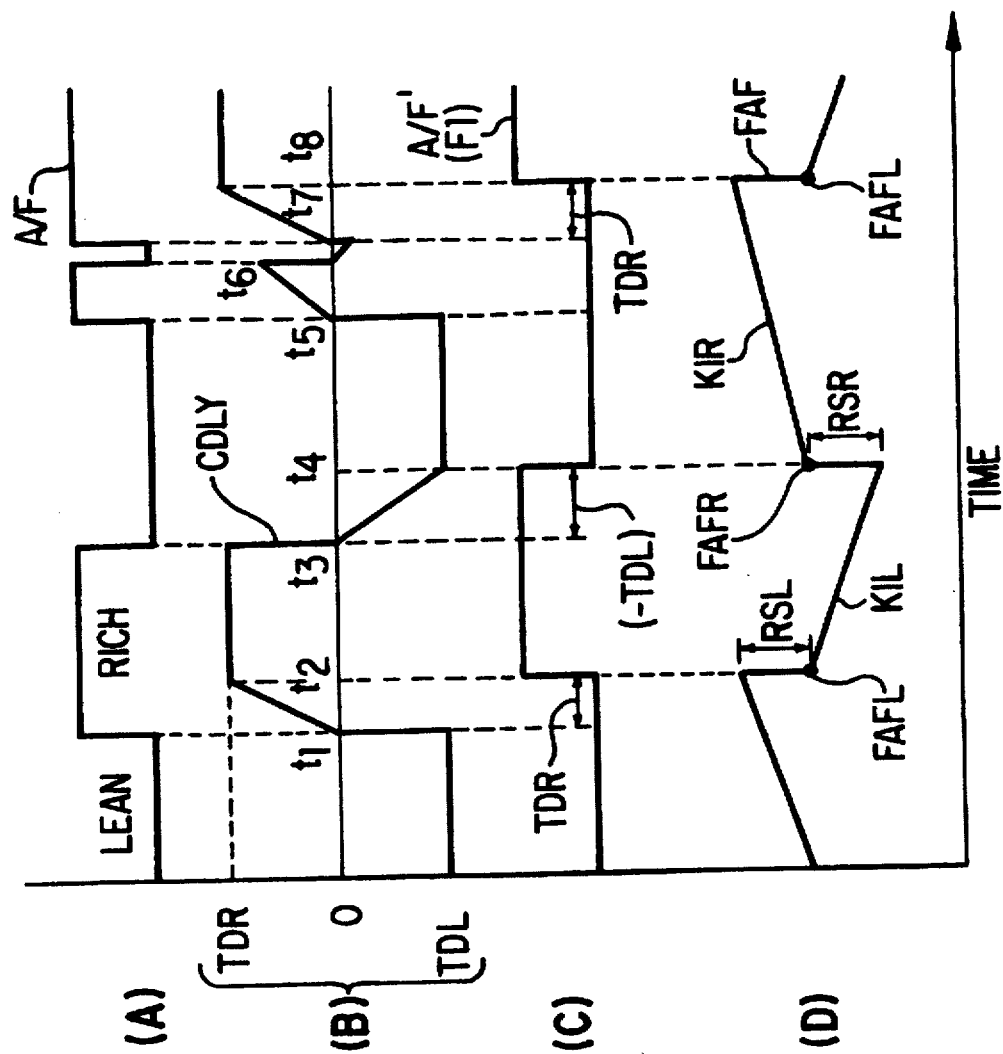
FIG. 8 is a time chart of the changes in values involved in the feedback control.

FIG. 8 is a timing chart for explaining the operation by the flow charts of FIG. 5 to FIG. 7. If the rich and lean judgement air-fuel ratio signal A/F shown in FIG. 8(A) is obtained from the output VOM of the upstream $O_2$ sensor 23, the delay counter CDLY is counted up in the rich state and counted down in the lean state as shown in FIG. 8(B). As a result, as shown in FIG. 8(C), the delayed air-fuel ratio signal A/F (corresponding to the flag F1) is formed. For example, even if the air-fuel ratio signal A/F is changed from lean to rich at the time $t_1$, the air-fuel ratio signal A/F is kept lean for exactly the rich delay time TDR, then is changed to rich at the time $t_2$. Further, even if the air-fuel ratio A/F is changed from rich to lean at the time $t_3$, the air-fuel ratio signal A/F is kept rich for exactly the lean delay time (−TDL), then changed to lean at the time $t_4$. However, if the air-fuel ratio signal A/F is inverted in a shorter time than the rich delay time TDR as shown by the times $t_5$, $t_6$, and $t_7$, it will take time for the delay counter CDLY to reach the maximum value TRD and, as a result, the air-fuel ratio signal A/F will be inverted at the time $t_8$. That is, the delayed air-fuel ratio signal A/F becomes stable compared with the air-fuel ratio signal A/F before the delay processing. In this way, a feedback correction coefficient FAF shown in FIG. 8(D) is obtained based on the delayed and stabilized air-fuel ratio signal A/F.

Next, an explanation will be made of the second air-fuel ratio feedback control by the downstream $O_2$ sensor 24. As the second air-fuel ratio feedback control, there is the system of controlling the constants involved in the first air-fuel ratio feedback control, that is, the skip amounts RSR and RSL, the integration constants KIR and KIL, the delay times TDR and TDL, or the relative voltage $V_{R1}$ of the output VOM of the upstream $O_2$ sensor 23 and the system of introducing a second air-fuel ratio correction coefficient FAF2.

For example, when the amount of skip to the rich direction, that is, the rich skip amount RSR, is made larger, the control air-fuel ratio can be shifted to the rich side. Further, even when the amount of skip in the lean direction, that is, the lean skip amount RSL, is made small, the control air-fuel ratio can be shifted to the rich side. On the other hand, when the lean skip amount RSL is made larger, the control air-fuel ratio can be shifted to the lean side. Further, even when the rich skip amount RSR is made small, the control air-fuel ratio can be shifted to the lean side. Accordingly, it is possible to control the air-fuel ratio by correcting the rich skip amount RSR and lean skip amount RSL in accordance with the output of the downstream $O_2$ sensor 24. Further, if the rich integration constant K is made larger, the control air-fuel ratio can be shifted to the rich side. Further, even when the lean integration constant KIL is made small, the control air-fuel ratio can be shifted to the rich side. On the other hand, if the lean integration constant KIL is made large, the control air-fuel ratio can be shifted to the lean side. Further, even if the rich integration constant KIR is made smaller, the control air-fuel ratio can be shifted to the lean side. Accordingly, by correcting the rich integration constant KIR and the lean integration constant KIL in accordance with the output of the downstream $O_2$ sensor 24, it becomes possible to control the air-fuel ratio. Further, if the rich delay time TDR is made larger or the lean delay time (-TDL) is made smaller, the control air-fuel ratio can be shifted to the rich side, while if the lean delay time (-TDL) is made larger or the rich delay time (TDR) is made smaller, the control air-fuel ratio can be shifted to the lean side. Further, if the relative voltage $V_{R1}$ is made larger, the control air-fuel ratio can be shifted to the rich side, while when the relative voltage $V_{R1}$ is made smaller, the control air-fuel ratio can be shifted to the lean side. Accordingly, by correcting the relative voltage $V_{R1}$ in accordance with the output VOS of the downstream $O_2$ sensor 24, it becomes possible to control the air-fuel ratio.

There are advantages to controlling the skip amount, integration constant, delay time, and relative voltage by the downstream $O_2$ sensor 24. For example, by controlling the delay time, it becomes possible to extremely finely adjust the air-fuel ratio, while by controlling the skip amount, control with a good response becomes possible without lengthening the feedback period of the air-fuel ratio. Note that these control amounts can naturally be used in combination.

Next, an explanation will be made of the double $O_2$ sensor system designed to control the amount of skip as a constant involved in the air-fuel ratio feedback control.

Figure 9:
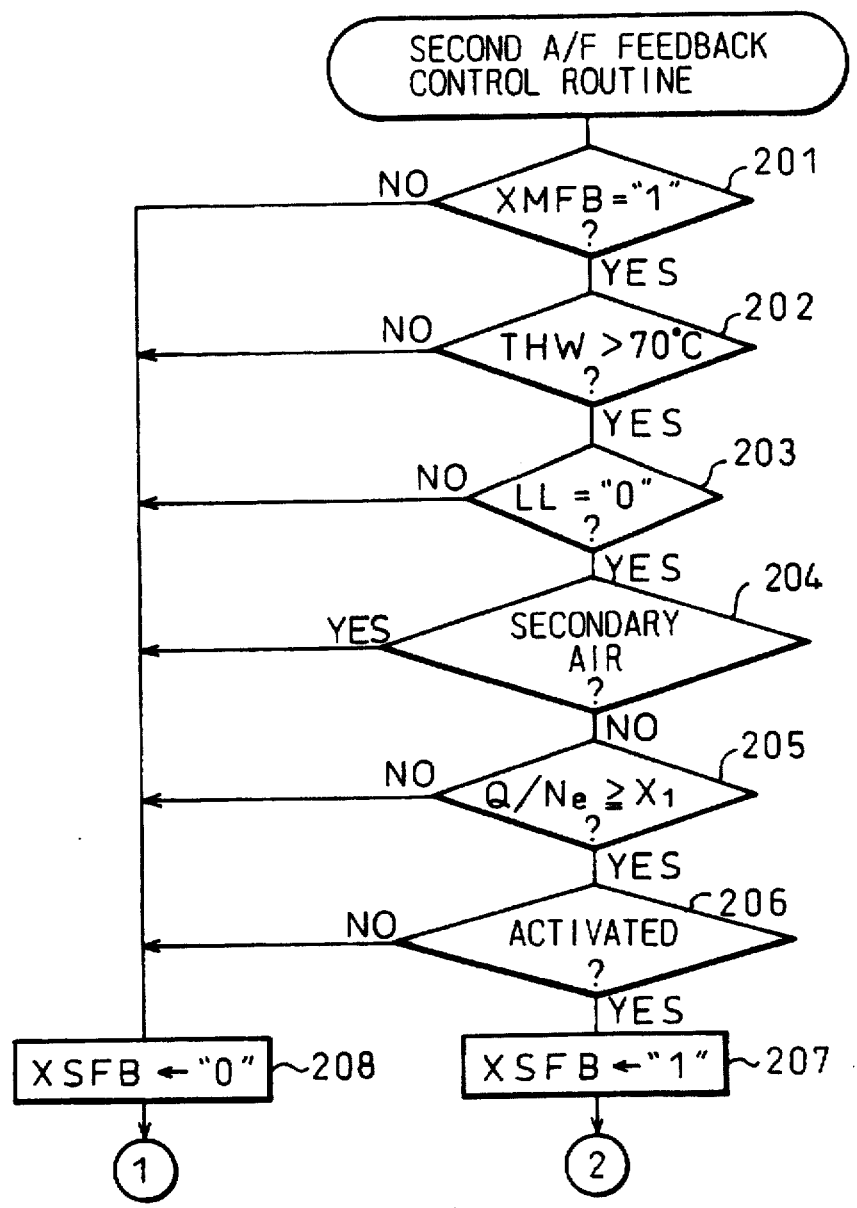
FIGS. 9, 10, and 11 are flow charts of the second air-fuel ratio feedback control.
Figure 10:
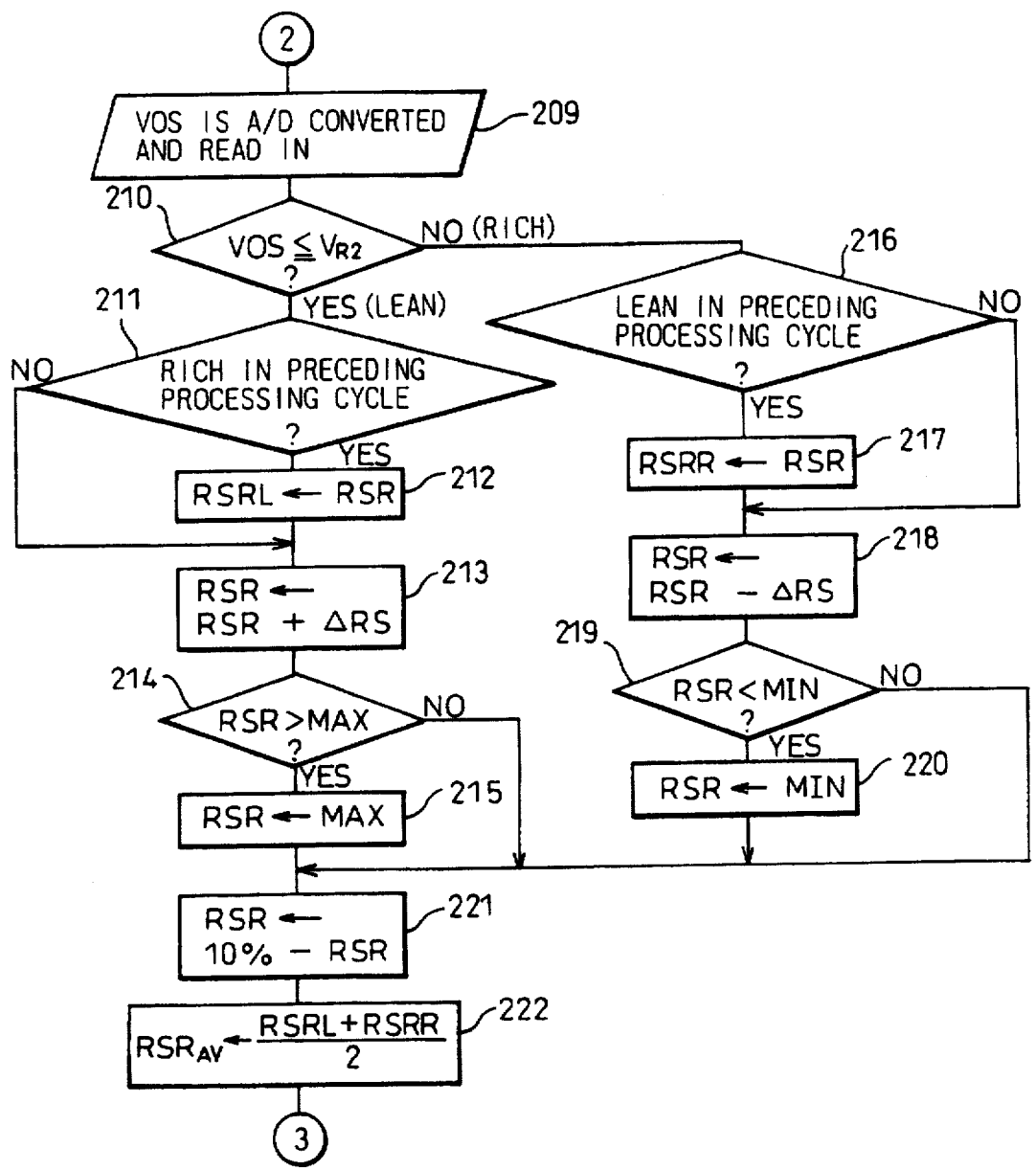
Figure 11:
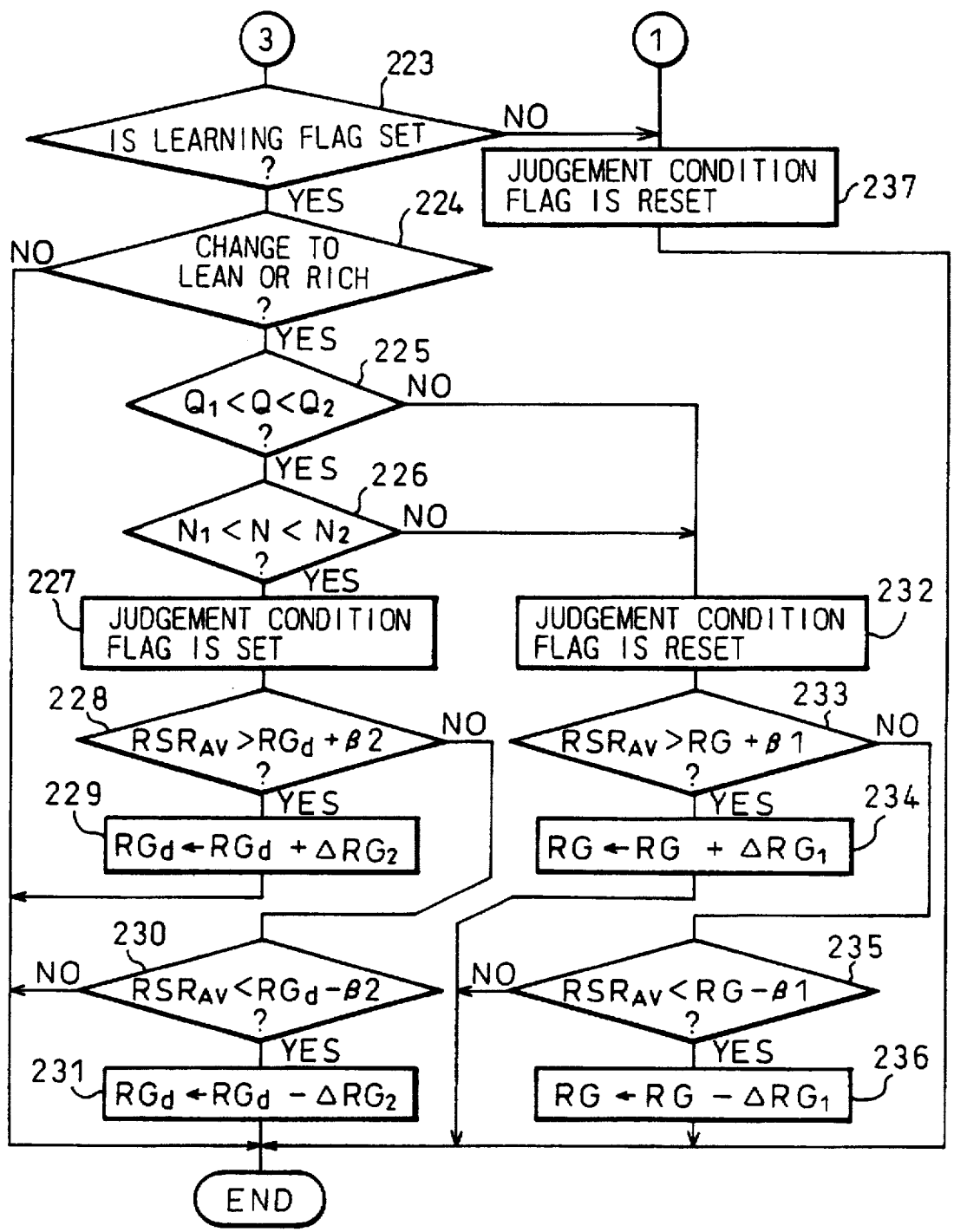

FIG. 9 to FIG. 11 show the second air-fuel ratio feedback control routine based on the output VOS of the downstream $O_2$ sensor 24 executed by interruption every predetermined time interval, for example, 512 ms. From step 201 to 206, it is judged if the conditions for feedback by the upstream $O_2$ sensor 23 are satisfied or not. For example, when the conditions for feedback by the upstream $O_2$ sensor 23 are not satisfied (step 201), when the coolant temperature THW is less than a set value (for example, 70° C.) (step 202), when the throttle valve 22 is open to the idling position (LL="1") (step 203), when the secondary air is introduced based on the engine speed, vehicle speed, output signal of the throttle sensor 19, coolant temperature THW, etc. (step 204), when the load is light (Q/N<$X_1$) (step 205), and when the downstream $O_2$ sensor 24 is not activated (step 206), it is judged that the conditions for feedback are not satisfied, while in other cases, it is judged that the conditions for feedback are satisfied. When the conditions for feedback are not satisfied, the routine proceeds to step 208 where the air-fuel ratio feedback flag XSFB is reset ("0"), while when the conditions for feedback are satisfied, the routine proceeds to step 207, where the air-fuel ratio feedback flag XSFB is set ("1"), then the routine proceeds to step 209.

At step 209, the output VOS of the downstream $O_2$ sensor 24 is converted from an analog to digital format and fetched, then at step 210, it is judged if the VOS is less than the relative voltage $V_{R2}$ (for example, $V_{R2}$=0.55 V) or not, that is, if the air-fuel ratio is rich or lean. When it is judged at step 210 that VOS$\leq V_{R2}$ (lean), the routine proceeds to step 211, while when it is judged that VOS>$V_{R2}$ (rich), the routine proceeds to step 216. At step 211, it is judged if the air-fuel ratio was rich at the time of the previous interruption, that is, if the air-fuel ratio changed from lean to rich between the previous interruption and the current interruption. When the air-fuel ratio changed from lean to rich between the previous interruption and the current interruption, the routine proceeds to step 212, where the amount of skip RSR is made RSRL (see FIG. 12). Next, at step 213, RSR←RSR+ΔRS (constant value), that is, the amount of rich skip RSR is increased to make the air-fuel ratio shift to the rich side, then at steps 214 and 215 the RSR is guarded by the maximum value MAX (=7.5%).

On the other hand, at step 216, it is judged if the air-fuel ratio was lean at the time of the previous interruption, that is, if the air-fuel ratio changed from rich to lean between the previous interruption and the current interruption. When the air-fuel ratio changed from rich to lean between the previous interruption and the current interruption, the routine proceeds to step 217, where the amount of skip RSR is made RSRR (see FIG. 12). Next, at step 218, RSR←RSR−ΔRS, that is, the amount of rich skip RSR is reduced to shift the air-fuel ratio to the lean side, then at steps 219 and 220, RSR is guarded by the minimum value MIN (=2.5%).

Next, at step 221, the amount of lean skip RSL is made RSL←10%−RSR. That is, RSR+RSL=10%. Next, at step 222, the average value of RSRL and RSRR, that is, the average value $RSR_{AV}$ of fluctuation of the amount of lean skip, is calculated. Next, at step 223, it is judged if the learning flag has been set. When the learning flag has not been set, the routine proceeds to step 237, where the judgement condition flag is reset. As opposed to this, if the learning flag has been set, the routine proceeds to step 224.

At step 224, it is judged if the air-fuel ratio has changed from lean to rich or from rich to lean in the period from the previous interruption to the current interruption. When the air-fuel ratio has changed from lean to rich or from rich to lean in the period from the previous interruption to the current interruption, the routine proceeds to step 225. At step 225, it is judged if the amount of intake air Q is $Q_1<Q<Q_2$. When $Q_1<Q<Q_2$, the routine proceeds to step 226, where it is judged if the engine speed N is $N_1<N<N_2$. When $N_1<N<N_2$, the routine proceeds to step 227, where the judgement condition flag is set. That is, when the learning flag is set and further the engine is made to operate in the operating region shown by the hatching in FIG. 4, the judgement condition flag is set. As opposed to this, when $Q_1<Q<Q_2$ or $N_1<N<N_2$ does not stand, the routine proceeds to step 232, where the judgement condition flag is reset.

Next, at step 233, it is judged if the average value $RSR_{AV}$ of fluctuation of the amount of rich skip is larger than the sum of the learning coefficient RG and a constant value $\beta 1$ $(RG+\beta 1)$. When $RSR_{AV} > RG+\beta 1$, the routine proceeds to step 234, where the constant value $\Delta RG_1$ is added to the learning coefficient RG. On the other hand, when $RSR_{AV} \leq RG+\beta 1$, the routine proceeds to step 235, where it is judged if the average value $RSR_{AV}$ of fluctuation of the amount of rich skip is smaller than $RG-\beta 1$. When $RSR_{AV} < RG-\beta 1$, the routine proceeds to step 236, where the constant value $\Delta RG_1$ is subtracted from the learning coefficient RG. In this way, the learning coefficient RG is controlled to track the average value $RSR_{AV}$ of fluctuation of the amount or rich skip. Note that at the time of engine startup, this learning coefficient RG is made the amount of rich skip RSR.

Figure 12:
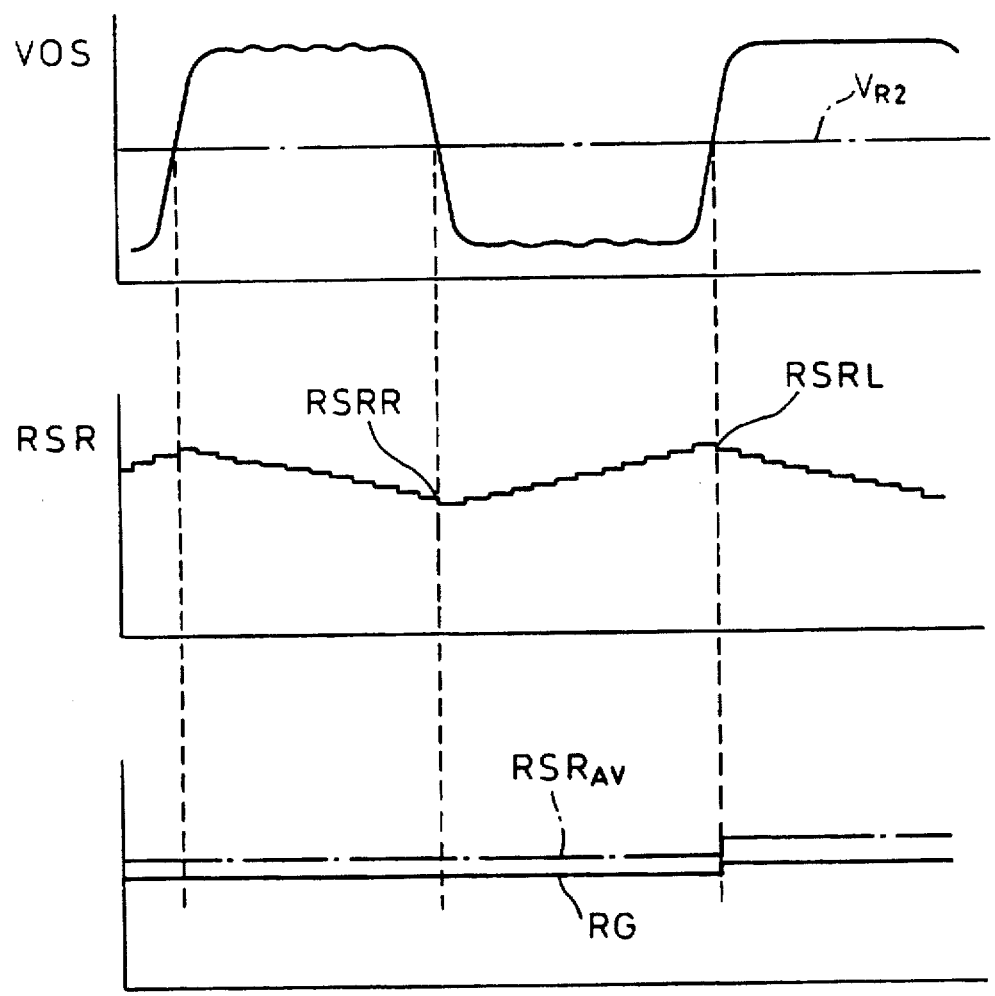
FIG. 12 is a time chart of the changes etc. in a skip amount SRS.

On the other hand, when the judgement condition flag is set at step 227, the routine proceeds to step 228, where it is judged if the average value $RSR_{AV}$ of fluctuation of the amount of rich skip is larger than the sum of the deterioration judgement learning coefficient $RG_d$ and a constant value $\beta 2$ ($\beta 2$ is smaller than $\beta 1$) $(RG_d+\beta 2)$. When $RSR_{AV}>RG_d+\beta 2$, the routine proceeds to step 229, where the constant value $\Delta RG_2$ ($\Delta RG_2$ is smaller than $\Delta RG_1$) is added to the learning coefficient $RG_d$. On the other hand, when $RSR_{AV} \leq RG_d+\beta 2$, the routine proceeds to step 230, where it is judged if the average value $RSR_{AV}$ of the fluctuation of the amount of rich skip is smaller than $RG_d-\beta 2$. When $RSR_{AV}<RG_d-\beta 2$, the routine proceeds to step 231, where the constant value $RG_2$ is subtracted from the learning coefficient $RG_d$. FIG. 12 shows the change in the amount of rich skip RSR and the change in the learning coefficient RG.

Note that as explained above the rate of updating of the learning coefficient $RG_d$ for judgement of deterioration is made slower than the rate of updating of the normal learning coefficient RG in the case of the learning coefficient for the amount of rich skip as well.

Figure 13:
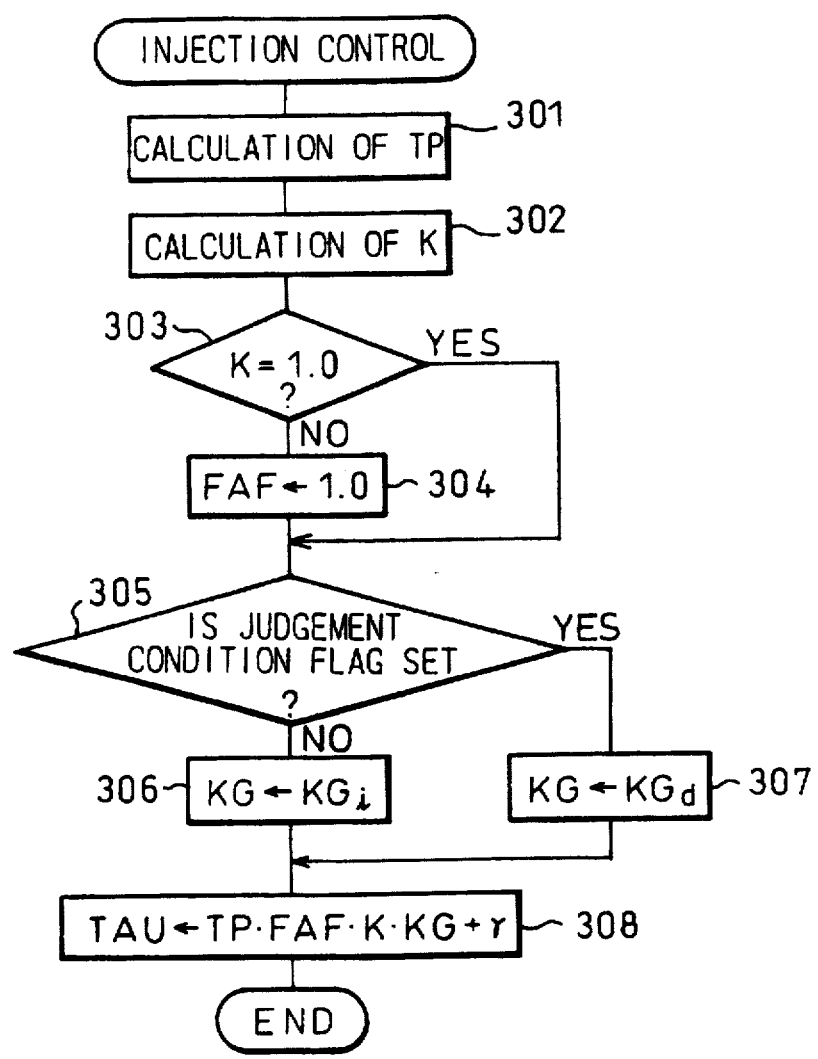
FIG. 13 is a flow chart of the control of the fuel injection.

FIG. 13 shows a routine for control of the fuel injection executed by interruption every predetermined crank angle for example.

Referring to FIG. 13, first, at step 301, the basic fuel injection time TP is calculated from the map shown in FIG. 2. Next, at step 302, the value of the correction coefficient K determined from the operating state of the engine is calculated. Next, at step 303, it is judged if the value of the correction coefficient K is 1.0 or not. When K=1.0, the routine jumps to step 305. As opposed to this, when K is not equal to 1.0, the routine proceeds to step 304, where the feedback correction coefficient FAF is fixed to 1.0, then the routine proceeds to step 305. At step 305, it is judged if the judgement condition flag has been set. When the judgement condition flag has not been set, the routine proceeds to step 306, where the learning coefficient $KG_i$ determined in accordance with the amount of intake air is made KG, then the routine proceeds to step 308. As opposed to this, when the judgement condition flag has been set, the routine proceeds to step 307, where the deterioration judgement learning coefficient $KG_d$ is made KG, then the routine proceeds to step 308. At step 308, the fuel injection time TAU $(=TP \cdot FAF \cdot K \cdot KG+\gamma)$ is calculated.

Next, an explanation will be made of the basic method for judgement of the deterioration of the three-way catalyst 14 used in the present invention referring to FIG. 14A to FIG. 16C.

Figure 14A:
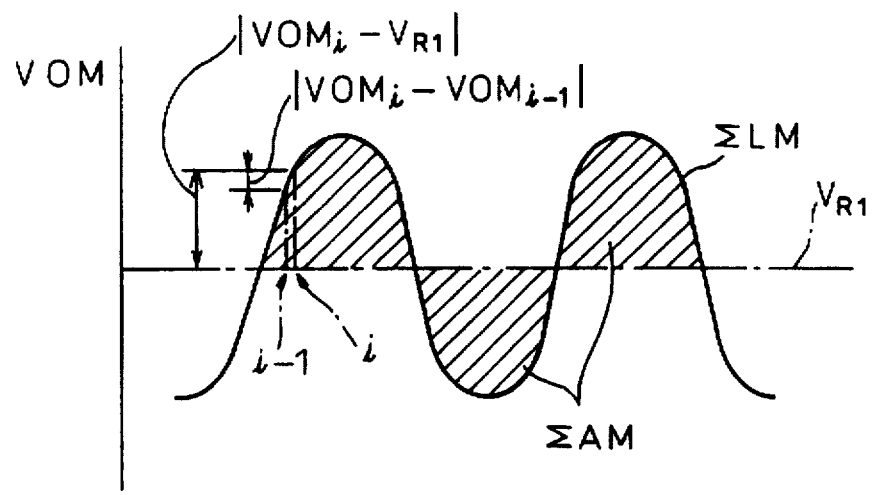
FIGS. 14A and 14B are views explaining the length and area of the output of an $O_2$ sensor.
Figure 14B:
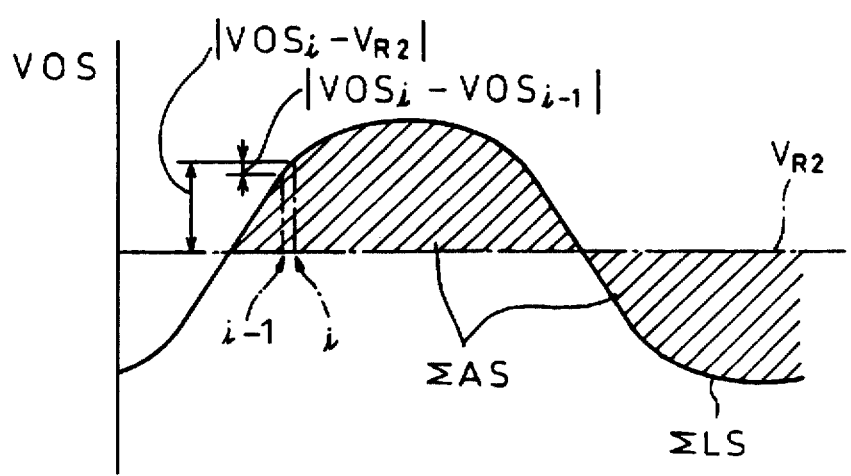

FIG. 14A shows the output voltage VOM of the upstream $O_2$ sensor 23 when feedback control of the air-fuel ratio is performed. FIG. 14B shows the output voltage VOS of the downstream $O_2$ sensor 24 when feedback control of the air-fuel ratio is performed. In the method of judgement of deterioration of the three-way catalyst 14 used in the present invention, the concepts of the length of the output of the $O_2$ sensors 23 and 24 and the area of the output of the $O_2$ sensors 23 and 24 were introduced. Here, the "length" of the output of the $O_2$ sensors 23 and 24 means the length of the curve of change of the output voltage VOM and VOS when taking the output voltages VOM and VOS on the vertical axis and time on the horizontal axis as shown in FIG. 14A and FIG. 14B.

In the embodiment of the present invention, as the value representing the length of the output, use is made of the cumulative value of the amount of change of the output voltages VOM and VOS of the upstream $O_2$ sensors 23 and 24 per predetermined time. That is, the length $\Sigma LM$ of the output of the upstream $O_2$ sensor 23, as shown in FIG. 14A, is expressed by the cumulative value of the absolute value $|VOM_i - VOM_{i-1}|$ of the difference between the output voltage $VOM_{i-1}$ at the time i−1 and the output voltage $VOM_i$ at the time i, while the length $\Sigma LS$ of the output of the downstream $O_2$ sensor 24, as shown in FIG. 14B, is expressed by the cumulative value of the absolute value $|VOS_i - VOS_{i-1}|$ of the difference between the output voltage $VOS_{i-1}$ at the time i−1 and the output voltage $VOS_i$ at the time i.

On the other hand, the "area" of the output of the $O_2$ sensors 23 and 24 means, as shown in FIG. 14A and FIG. 14B, the area shown by the hatching enclosed by the output voltages VOM and VOS and the relative voltages $V_{R1}$ and $V_{R2}$ when taking the output voltages VOM and VOS on the vertical axis and taking time on the horizontal axis. In the embodiment of the present invention, as the value representing this area, use is made of the cumulative value of the difference between the output voltages VOM and VOS and relative voltages $V_{R1}$ and $V_{R2}$ of the $O_2$ sensors 23 and 24 for each predetermined time. That is, the area $\Sigma AM$ of the output of the upstream $O_2$ sensor 23 is expressed by the cumulative value of the absolute value $|VOS_i - V_{R1}|$ of the difference between the output voltage $VOS_i$ and the relative voltage $V_{R1}$ at each time as shown in FIG. 14A, while the area $\Sigma AS$ of the output of the downstream $O_2$ sensor 24 is expressed by the cumulative value of the absolute value $|VOS_i - V_{R2}|$ of the difference between the output voltage $VOS_i$ and the relative voltage $V_{R2}$ at each time as shown in FIG. 14B.

Figure 15:
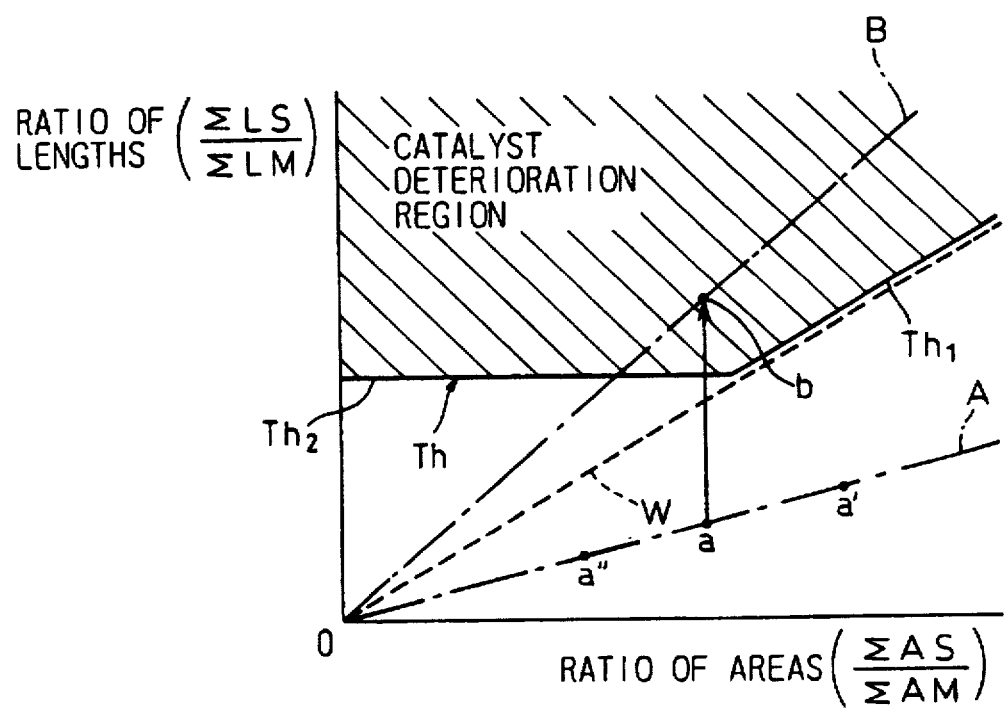
FIG. 15 is a view of a region of deterioration of the catalyst.

Further, the ratio between the length $\Sigma LS$ of the output of the downstream $O_2$ sensor 24 and the length $\Sigma LM$ of the output of the upstream $O_2$ sensor 23 ($\Sigma LS/\Sigma LM$) is defined as the ratio of length and the ratio between the area $\Sigma AS$ of the output of the downstream $O_2$ sensor 24 and the area $\Sigma AM$ of the output of the upstream $O_2$ sensor 23 ($\Sigma AS/\Sigma AM$) is defined as the ratio of area. Using the ratio of length and the ratio of area and taking the ratio of length ($\Sigma LS/\Sigma LM$) on the vertical axis and the ratio of area ($\Sigma AS/\Sigma AM$) on the horizontal axis as shown in FIG. 15, basically it can be judged that the three-way catalyst 14 is not deteriorated in the region below the broken line W shown in FIG. 15 and that the three-way catalyst 14 has deteriorated in the region above the broken line W. Next, this will be explained referring to FIG. 16.

Figure 16A:
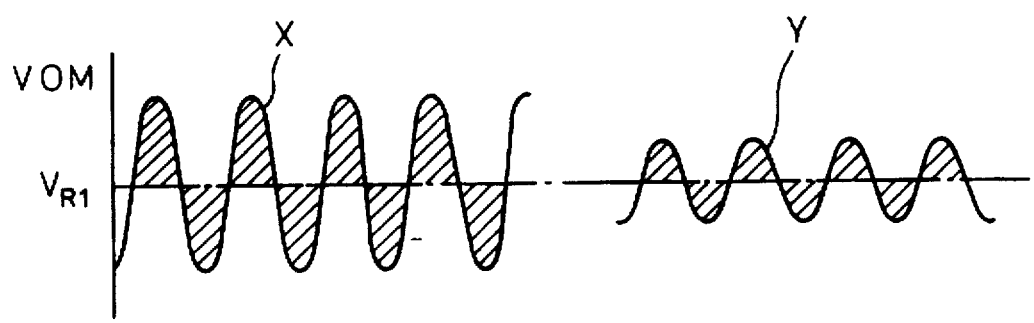
FIGS. 16A, 16B, and 16C are views of changes in the output voltage of the $O_2$ sensor.

The curve X of FIG. 16A shows the change in the output voltage VOM of the upstream $O_2$ sensor 23 in the case where the upstream $O_2$ sensor 23 has not deteriorated. The curve X of FIG. 16B and the curve X of FIG. 16C show the change in the output voltage VOS of the downstream $O_2$ sensor 24 in the case where the downstream $O_2$ sensor 24 has not deteriorated and further the three-way catalyst 14 has not deteriorated. In this way, the relationship between the ratio of area and the ratio of length when neither of the $O_2$ sensors 23 and 24 has deteriorated and further the three-way catalyst 14 has not deteriorated either is shown by the point a of FIG. 15.

Now, if the upstream $O_2$ sensor 23 has deteriorated, the amplitude of the output voltage VOM of the upstream $O_2$ sensor 23 becomes smaller as shown by the curve Y of FIG. 16A. At this time, as understood from the curve X and curve Y of FIG. 16A, the length $\Sigma LM$ of the output becomes small and the area $\Sigma AM$ of the output becomes small in proportion to this. Accordingly, the ratio of length becomes larger and the ratio of area becomes larger in proportion to this. Therefore, at this time, the point a of FIG. 15 shifts to the point a'.

Figure 16B:
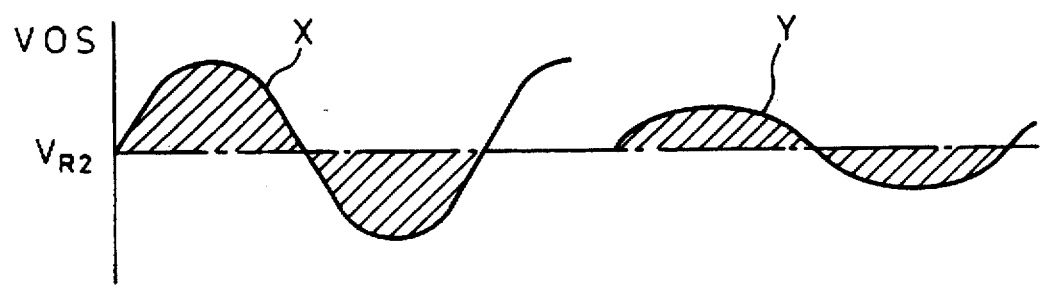
Figure 16C:
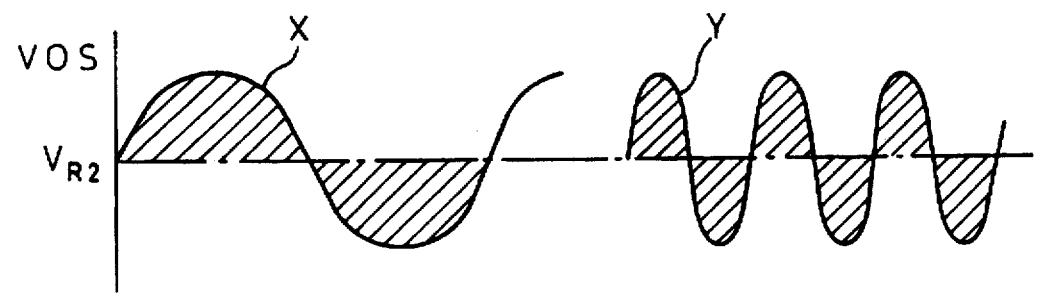

As opposed to this, if it is assumed that the downstream $O_2$ sensor 24 has deteriorated, the amplitude of the output voltage VOS of the downstream $O_2$ sensor 24 becomes smaller as shown by the curve Y in FIG. 16B. At this time, as will be understood from the curve X and the curve Y of FIG. 16B, when the length $\Sigma LS$ of the output becomes small, the area $\Sigma AS$ of the output becomes smaller as well in proportion to this. Accordingly, at this time, the ratio of length becomes smaller, the ratio of area becomes smaller in proportion to this, and therefore at this time the point a of FIG. 15 shifts to the point a".

In this way, when the $O_2$ sensors 23 and 24 deteriorate, the point showing the ratio of length and ratio of area shifts on the line A passing through the origin O.

On the other hand, when the three-way catalyst 14 deteriorates, the action of oxidation of the unburnt hydrocarbons and carbon monoxide and the action of reduction of the $NO_x$ based on the $O_2$ storage function are no longer sufficiently performed, so the air-fuel ratio on the downstream side of the three-way catalyst 14 fluctuates with a shorter period. In this case, the more the three-way catalyst 14 is deteriorated, the shorter the period of fluctuation of the output voltage VOS of the downstream $O_2$ sensor 24. When the three-way catalyst 14 ends up completely deteriorating, the output voltage VOS of the downstream $O_2$ sensor 24 fluctuates by the same period as the output voltage VOM of the upstream $O_2$ sensor 23. The curve Y in FIG. 16C shows when the three-way catalyst 14 has deteriorated. As will be understood from the curve X and curve Y of FIG. 16C, when the three-way catalyst 14 deteriorates, the period of fluctuation of the downstream $O_2$ sensor 24 becomes shorter.

In this way, when the three-way catalyst 14 deteriorates, the period of fluctuation of the downstream $O_2$ sensor 24 becomes shorter, so the length $\Sigma LS$ of the output becomes larger. On the other hand, even when the period of fluctuation of the downstream $O_2$ sensor 24 changes, the area $\Sigma AS$ of the output within a predetermined time does not change much at all. Accordingly, if the three-way catalyst 14 deteriorates, the ratio of length becomes larger, but the ratio of area does not change much at all and thus the point a of FIG. 15 shifts to the point b. Further, if the $O_2$ sensors 23 and 24 deteriorate in the state where the three-way catalyst 14 has deteriorated, the point showing the relationship between the ratio of length and the ratio of area shifts on the line B passing through the origin O. Accordingly, as explained above, basically, if the point showing the relationship between the ratio of length and the ratio of area is positioned in the area above the line W passing through the origin O, it may be judged that the three-way catalyst 14 has deteriorated.

In actuality, however, in particular, the output voltage VOS of the downstream $O_2$ sensor 24 does not change by a clean waveform as shown in FIG. 16B and FIG. 16C. A fine vibration is superposed on the curves X and Y shown by FIG. 16B and FIG. 16C. This fine vibration does not have that great an effect on the area $\Sigma AM$ of the output of the downstream $O_2$ sensor 24, but has a larger effect on the length $\Sigma LS$ of the output the smaller the ratio of length ($\Sigma LS/\Sigma LM$). That is, if the length $\Sigma LS$ of the output is increased by exactly a certain amount due to the fine vibration superposed on the curves X and Y, the amount of increase of the ratio of length becomes larger the smaller the ratio of length. Accordingly, if it is judged that the three-way catalyst 14 has deteriorated by the line W being exceeded, when the ratio of length is small, there is a danger of erroneous judgement that the three-way catalyst 14 has deteriorated despite the three-way catalyst 14 not having deteriorated.

Therefore, in this embodiment of the present invention, as shown in FIG. 15, the threshold level Th of the judgement of deterioration of the catalyst is made the threshold level $Th_1$ matching the line W in the region where the ratio of length and ratio of area are large to a certain degree. In the region where the ratio of length and the ratio of area are small, the threshold level $Th_2$ is made a certain ratio of length. Accordingly, if the point showing the relationship between the ratio of length and the ratio of area in this embodiment of the present invention is positioned in the region above the set value in FIG. 15, that is, the threshold levels $Th_1$ and $Th_2$, it is judged that the three-way catalyst 14 has deteriorated. Note that the threshold level $Th_2$ is not derived from theory, but is determined based on experiments so that there are no erroneous judgements.

Next, an explanation will be made of the routine for judgement of deterioration of the three-way catalyst 14 referring to FIG. 17 and FIG. 18. Note that this routine is executed by interruption every predetermined time interval.

Figure 18:
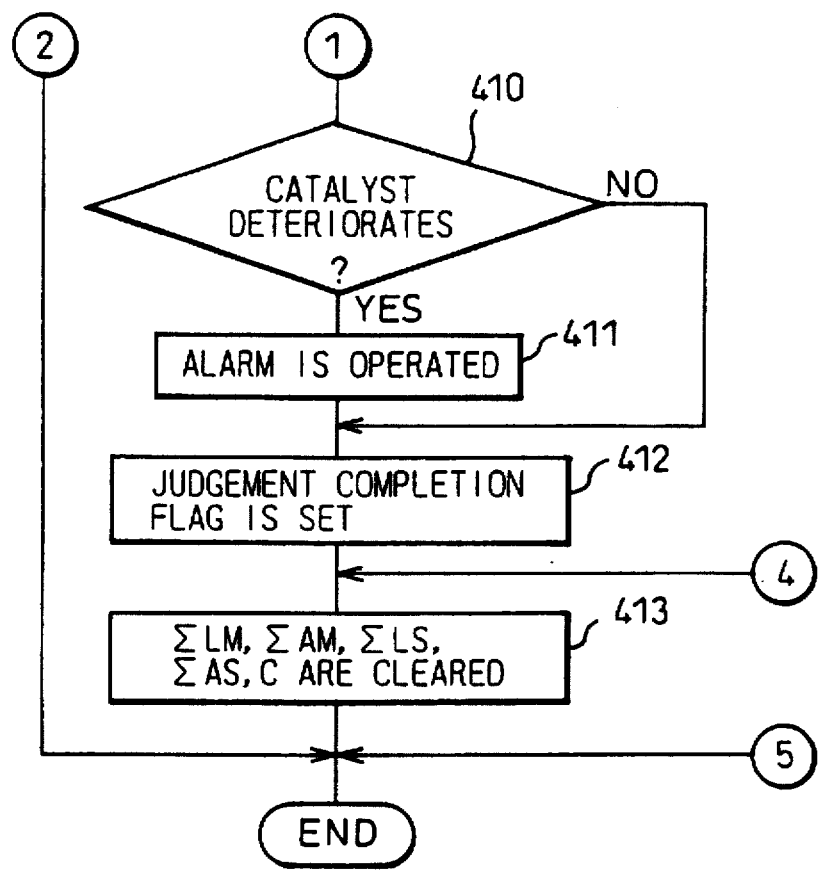

Referring to FIG. 17 and FIG. 18, first, at step 401, it is judged if the judgement completion flag showing that the judgement of deterioration has ended has been set or not. When the judgement completion flag has been set, the processing cycle is immediately ended. As opposed to this, when it is judged that the judgement completion flag has not been set, the routine proceeds to step 402, where it is judged if the judgement condition flag has been set or not. When the judgement condition flag has been set, that is, the engine is operating in the operating region shown by the hatching in FIG. 4, the routine proceeds to step 403, where the processing for cumulatively adding the length $\Sigma LM$ of the output of the upstream $O_2$ sensor 23 is performed based on the following equation:

$$\Sigma LM = \Sigma LM + |VOM_t - VOM_{t-1}|$$

Next, at step 404, the processing for cumulatively adding the area $\Sigma AM$ of the output of the upstream $O_2$ sensor 23 is performed based on the following equation:

$$\Sigma AM = \Sigma AM + |VOM_t - V_{R1}|$$

Next, at step 405, the processing for cumulatively adding the length ΣLS of the output of the downstream $O_2$ sensor 24 is performed based on the following equation:

$$\Sigma LS = \Sigma LS + |VOS_i - VOS_{i-1}|$$

Next, at step 406, the processing for cumulatively adding the area ΣAS of the output of the downstream $O_2$ sensor 24 is performed based on the following equation:

$$\Sigma AS = \Sigma AS + |VOS_i - V_{R2}|$$

Next, at step 407, the count C is incremented by exactly 1, then at step 408, it is judged if the count C has exceeded the set value $C_0$. When $C \leq C_0$, the processing cycle is ended. As opposed to this, when $C > C_0$, that is, when a predetermined time has elapsed from the start of the judgement of deterioration, the routine proceeds to step 409.

At step 409, the ratio of length ΣLS/ΣLM and ratio of area ΣAS/ΣAM are calculated. Next, at step 410, it is judged whether the three-way catalyst 14 has deteriorated from the relationship shown in FIG. 15. When it is judged that the three-way catalyst 14 has not deteriorated, the routine proceeds to step 412, where the judgement completion flag is set. As opposed to this, when it is judged that the three-way catalyst 14 has deteriorated, the routine proceeds to step 411 where the alarm device 25 is actuated, then the routine proceeds to step 412. Next, at step 413, the various values involved in the judgement of deterioration are cleared. Note that even when the judgement condition flag is reset at step 402, the routine jumps to step 413 where the various values involved in the judgement of deterioration are similarly cleared.

While the invention has been described by reference to a specific embodiment chosen for purposes of illustration, it should be apparent that numerous modifications could be made thereto by those skilled in the art without departing from the basic concept and scope of the invention.

I claim:

1. A device for judging the deterioration of a catalyst arranged in an exhaust passage of an engine, said device comprising:

air-fuel ratio detecting means arranged in the exhaust passage and producing an output signal which represents an air-fuel ratio;

feedback control means for controlling an air-fuel ratio by a feedback control value, which changes in accordance with a change in the output signal of said air-fuel ratio detecting means, to equalize the air-fuel ratio with a target air-fuel ratio;

first learning value calculating means for calculating a first learning value, which represents a value of the center of fluctuation of said feedback control value when the engine is operating in a predetermined first operating region, to reflect said first learning value in control of the air-fuel ratio when the engine is operating in said first operating region;

judging means for judging whether or not the catalyst has deteriorated when the engine is operating under a predetermined second operating region which is a limited narrower region within said first operating region; and second learning value calculating means for calculating a second learning value, which represents a value of the center of fluctuation of said feedback control value when the engine is operating in said second operating region, to reflect said second learning value in control of the air-fuel ratio when the engine is operating in said second operating region.

2. A device as set forth in claim 1, wherein said first operating region is divided into a plurality of learning regions and a first learning value is set for each of the learning regions, said first learning value calculating means calculates each corresponding first learning value when the engine is operating in each learning region and reflects each corresponding first learning value in the control of the air-fuel ratio when the engine is being operated in each learning region, and said second operating region is a narrow limited region in one learning region among these learning regions.

3. A device as set forth in claim 2, wherein said first operating region is divided into said plurality of learning regions in accordance with an amount of intake air supplied to the engine, the range of said second operating region is determined by the amount of intake air, and the range of the amount of intake air determining said second operating region is narrower than the range of the amount of intake air determining the learning region including said second operating region.

4. A device as set forth in claim 3, wherein the range of said second operating region is determined by the amount of intake air and the engine speed.

5. A device as set forth in claim 1, wherein a rate of updating of said second learning value is slower than a rate of updating of said first learning value.

6. A device as set forth in claim 1, wherein said feedback control value is a feedback correction coefficient, said first learning value is used to maintain said feedback correction coefficient at a reference value, when the engine is operating in said first operating region, and said second learning value is used to maintain said feedback correction coefficient at a reference value when the engine is operating in said second operating region.

7. A device as set forth in claim 6, wherein said first learning value is updated when the engine is operating in said first operating region and said feedback correction coefficient deviates by at least a predetermined first value from said reference value, and said second learning value is updated when the engine is operating in said second operating region and said feedback correction coefficient deviates by at least a predetermined second value from said reference value.

8. A device as set forth in claim 7, wherein said second value is smaller than said first value.

9. A device as set forth in claim 7, wherein the amount of updating of said second learning value is smaller than the amount of updating of said first learning value.

10. A device as set forth in claim 1, wherein said air-fuel ratio detecting means is comprised by an upstream air-fuel ratio sensor arranged in the exhaust passage upstream of the catalyst and a downstream air-fuel ratio sensor arranged in the exhaust passage downstream of the catalyst, said first learning value and said second learning value are calculated based on an output signal of said upstream air-fuel ratio sensor, and auxiliary feedback controlling means is provided for making the air-fuel ratio match a target air-fuel ratio based on the output signal of said downstream air-fuel ratio sensor when the air-fuel ratio deviates from the target air-fuel ratio.

11. A device as set forth in claim 10, wherein said auxiliary feedback control means is provided with: third learning value calculating means for calculating a third learning value for making the air-fuel ratio match a target air-fuel ratio when the engine is operating in said first operating region and fourth learning value calculating means for calculating a fourth learning value for making the air-fuel ratio match a target air-fuel ratio when the engine is operating in said second operating region.

12. A device as set forth in claim 11, wherein a rate of updating of said fourth learning value is slower than a rate of updating of said third learning value.

13. A device as set forth in claim 11, wherein said feedback control value is a feedback correction coefficient, said feedback correction coefficient is changed by exactly a predetermined skip value when it is judged based on the output signal of said upstream air-fuel ratio sensor that the air-fuel ratio has changed from the lean side to rich side or from the rich side to lean side of a target air-fuel ratio, said auxiliary feed controlling means gradually updates the skip value in a direction so that the air-fuel ratio becomes richer when the air-fuel ratio detected by said downstream air-fuel ratio sensor is at the lean side of a target air-fuel ratio and gradually updates the skip value in a direction so that the air-fuel ratio becomes leaner when the air-fuel ratio detected by said downstream air-fuel ratio sensor is at the rich side of a target air-fuel ratio, said third learning value calculating means updates the third learning value when an average value of said skip value deviates by more than a predetermined first value, and said fourth learning value calculating means updates the fourth learning value when an average value of said skip value deviates by more than a predetermined second value.

14. A device as set forth in claim 13, wherein said second value is smaller than said first value.

15. A device as set forth in claim 13, wherein the amount of updating of said fourth learning value is smaller than the amount of updating of said third learning value.

16. A device as set forth in claim 13, wherein said fourth learning value is used as the skip value when the operating state of the engine shifts from said first operating state to said second operating state.

17. A device as set forth in claim 13, wherein said third learning value is used as the skip value at the time of engine startup.

* * * * *